Dec. 3, 1968   B. L. AUSTIN   3,414,327
APPARATUS AND METHODS FOR CUTTING CONCRETE SURFACES
Filed June 13, 1966   11 Sheets-Sheet 1
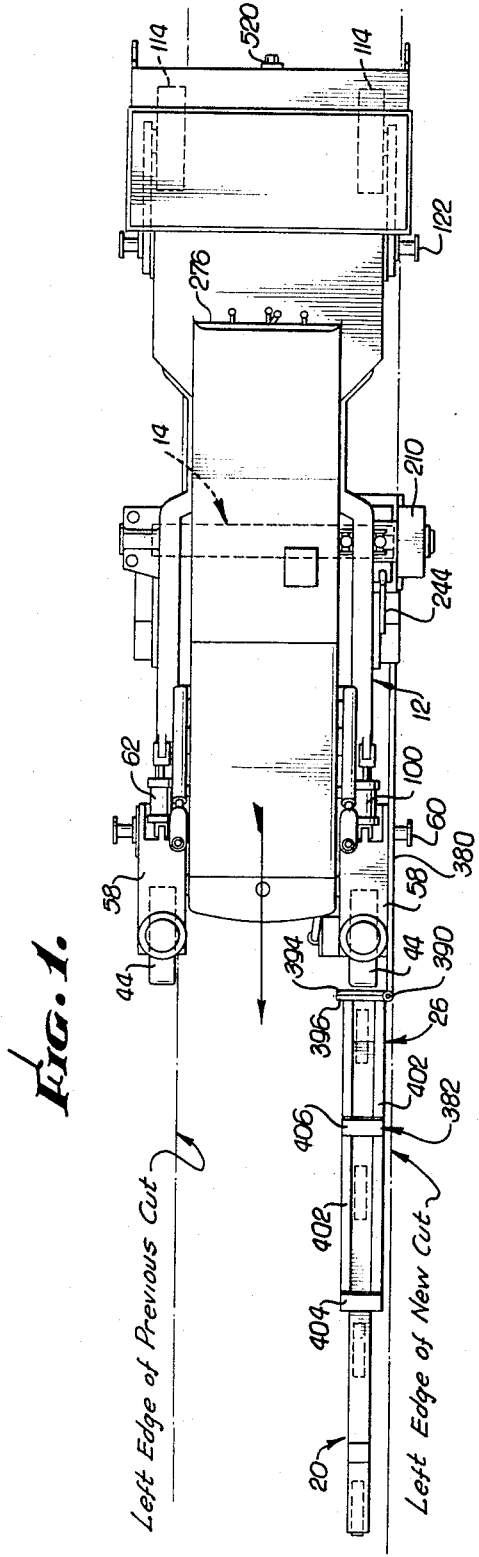
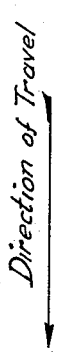
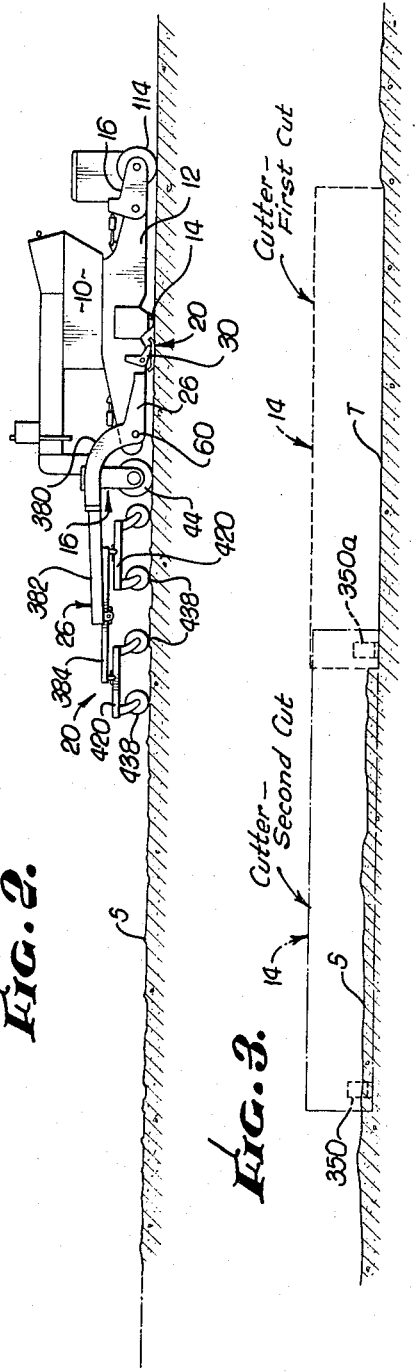
INVENTOR
BENJAMIN L. AUSTIN
By Bernard Kriegel
ATTORNEY

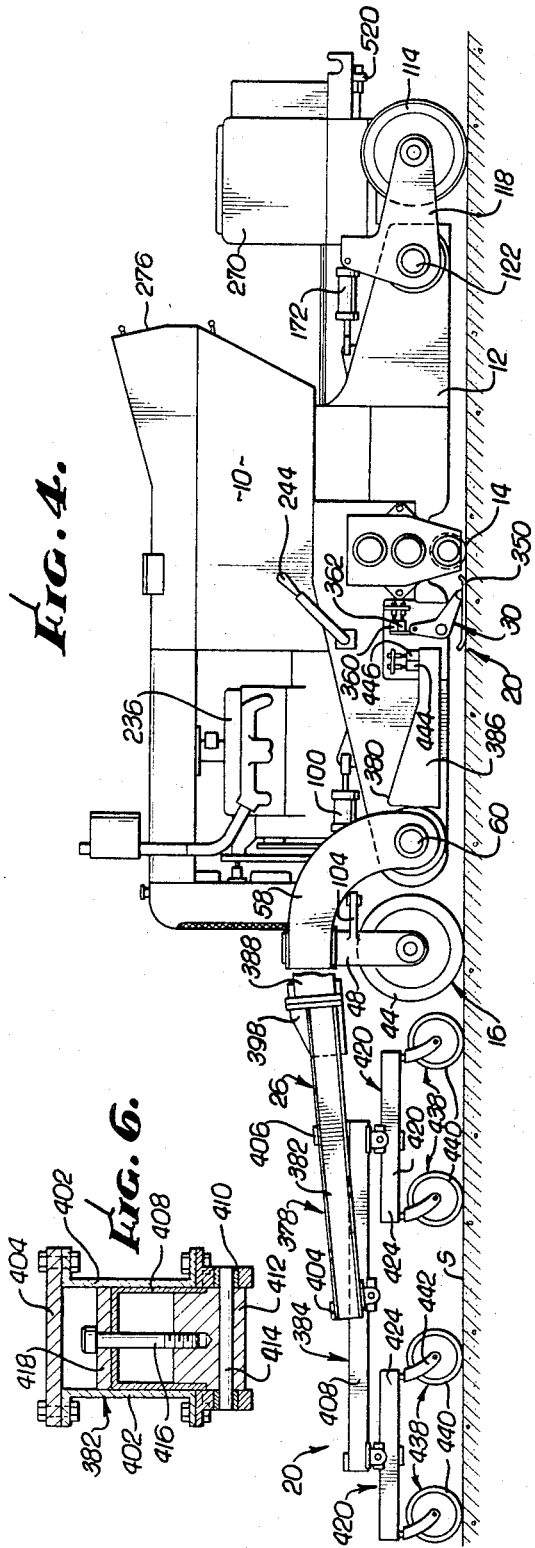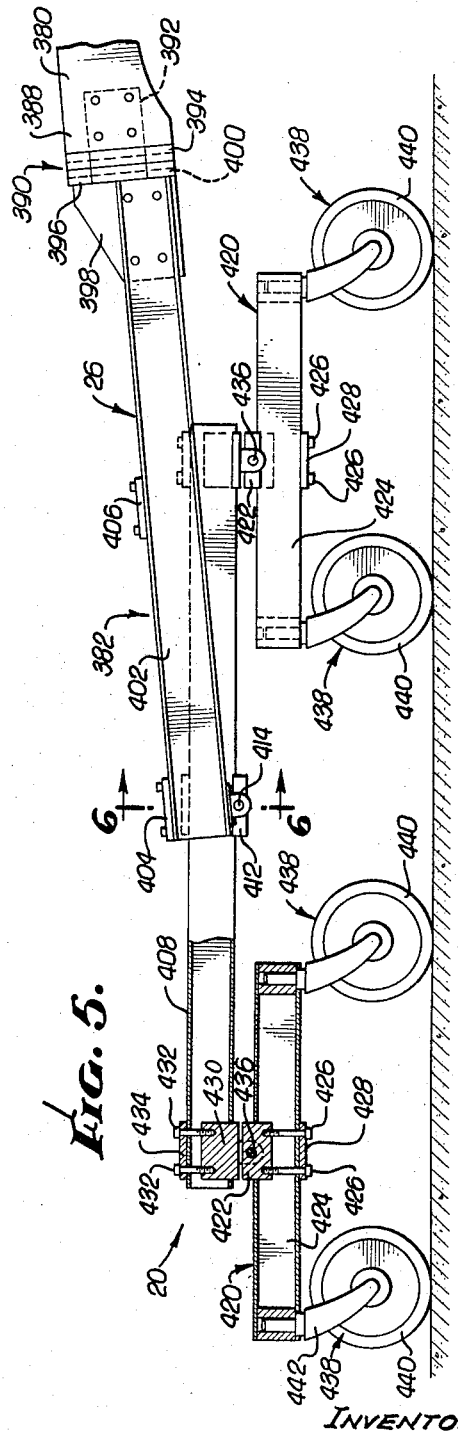

Dec. 3, 1968   B. L. AUSTIN   3,414,327
APPARATUS AND METHODS FOR CUTTING CONCRETE SURFACES
Filed June 13, 1966   11 Sheets-Sheet 3
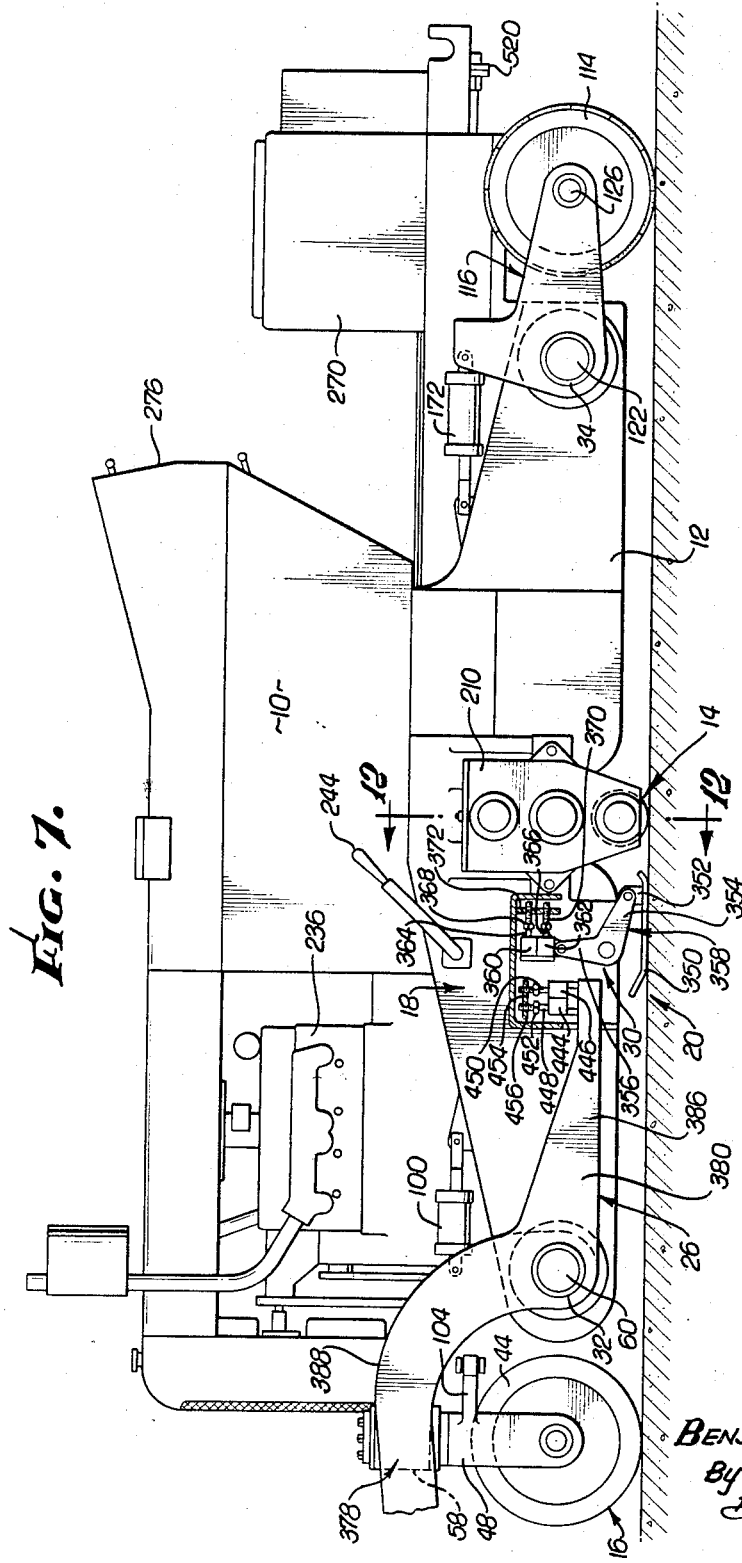
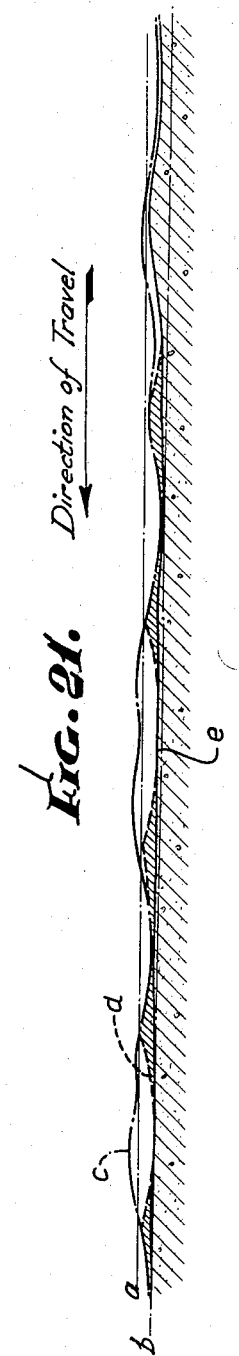
INVENTOR.
BENJAMIN L. AUSTIN
BY Bernard Kriegel
ATTORNEY.

INVENTOR.
BENJAMIN L. AUSTIN
By Bernard Kriegel
ATTORNEY.

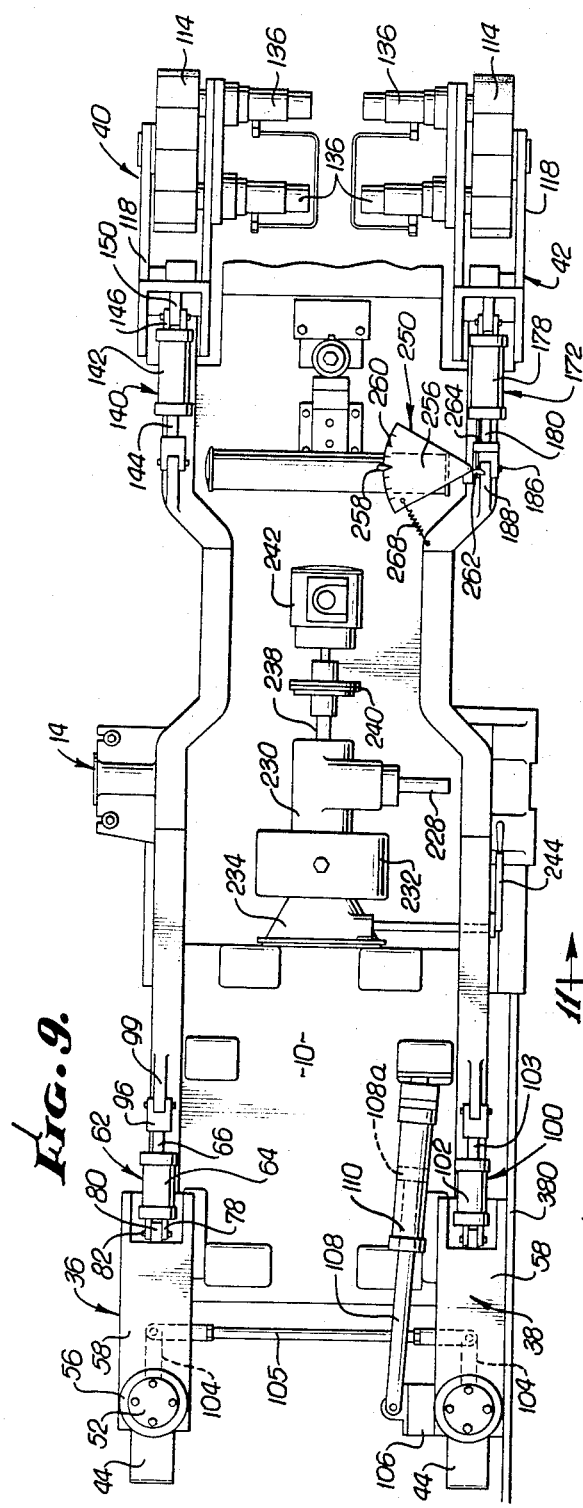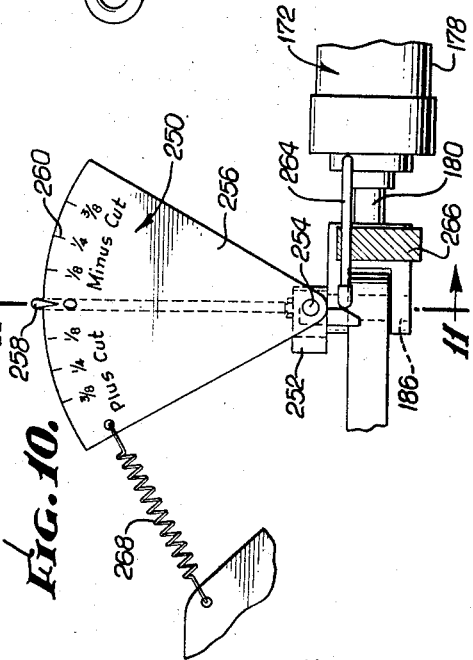

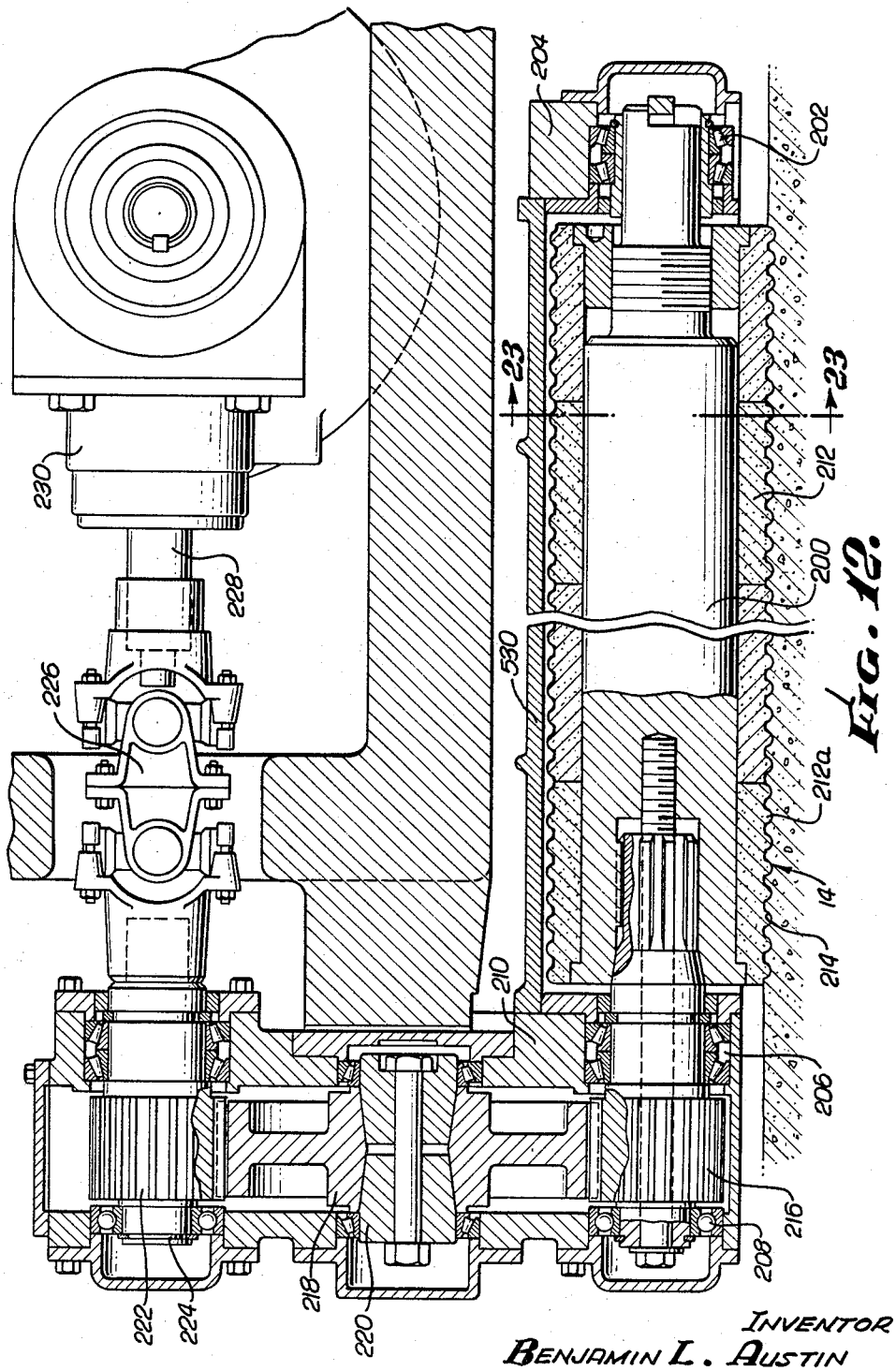

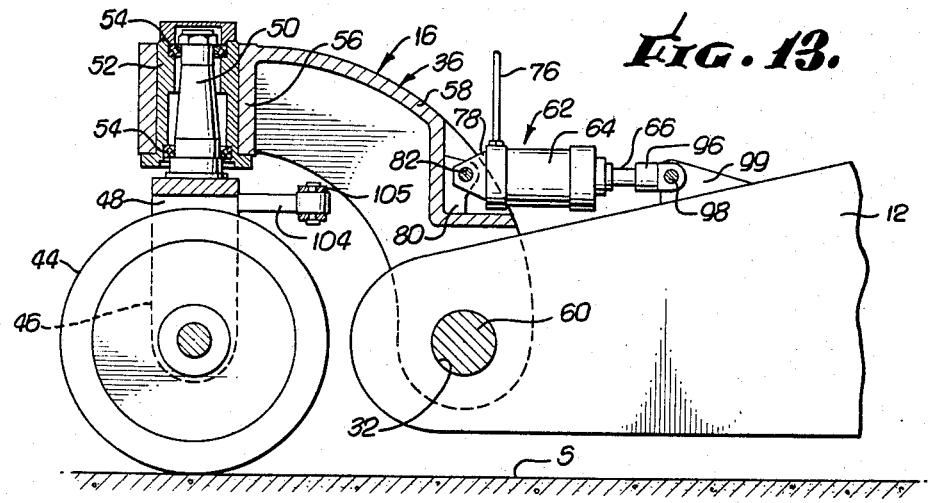
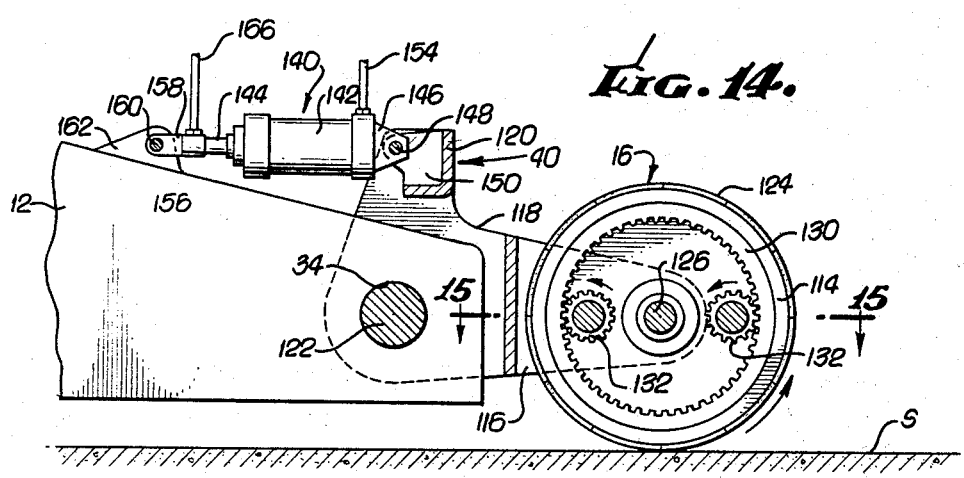
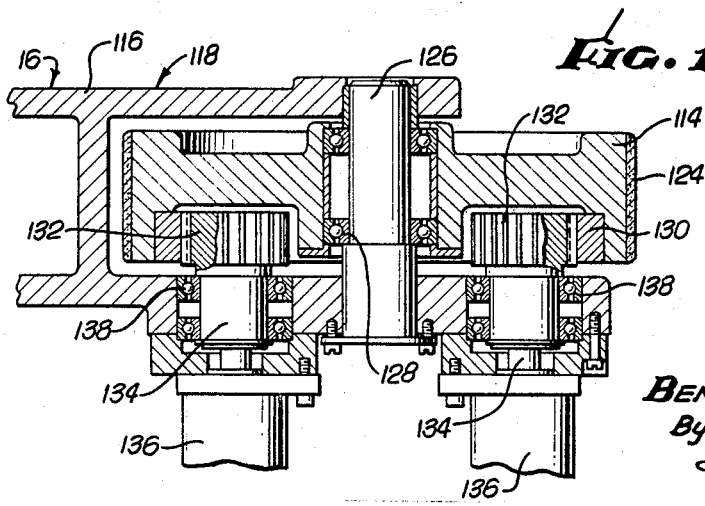

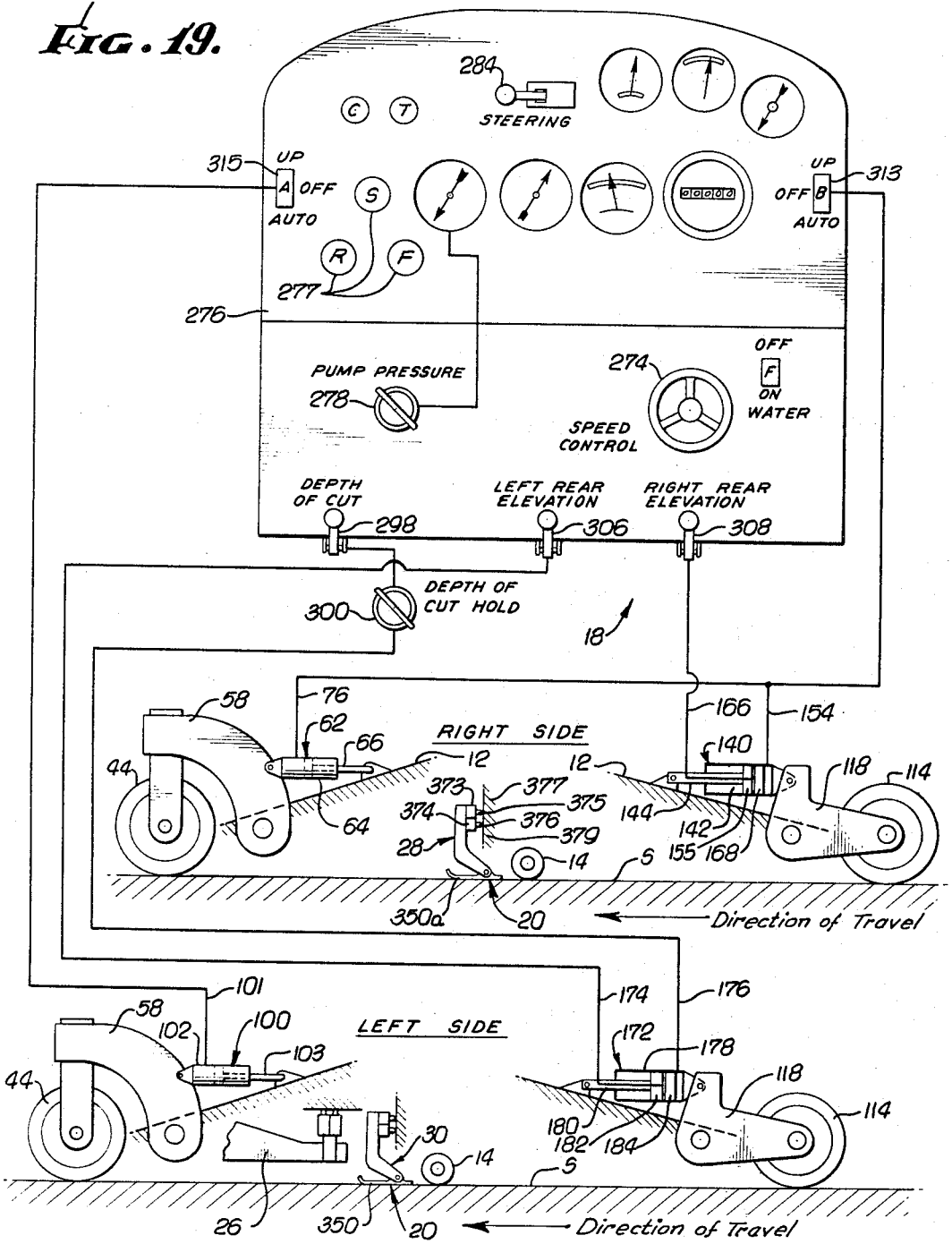

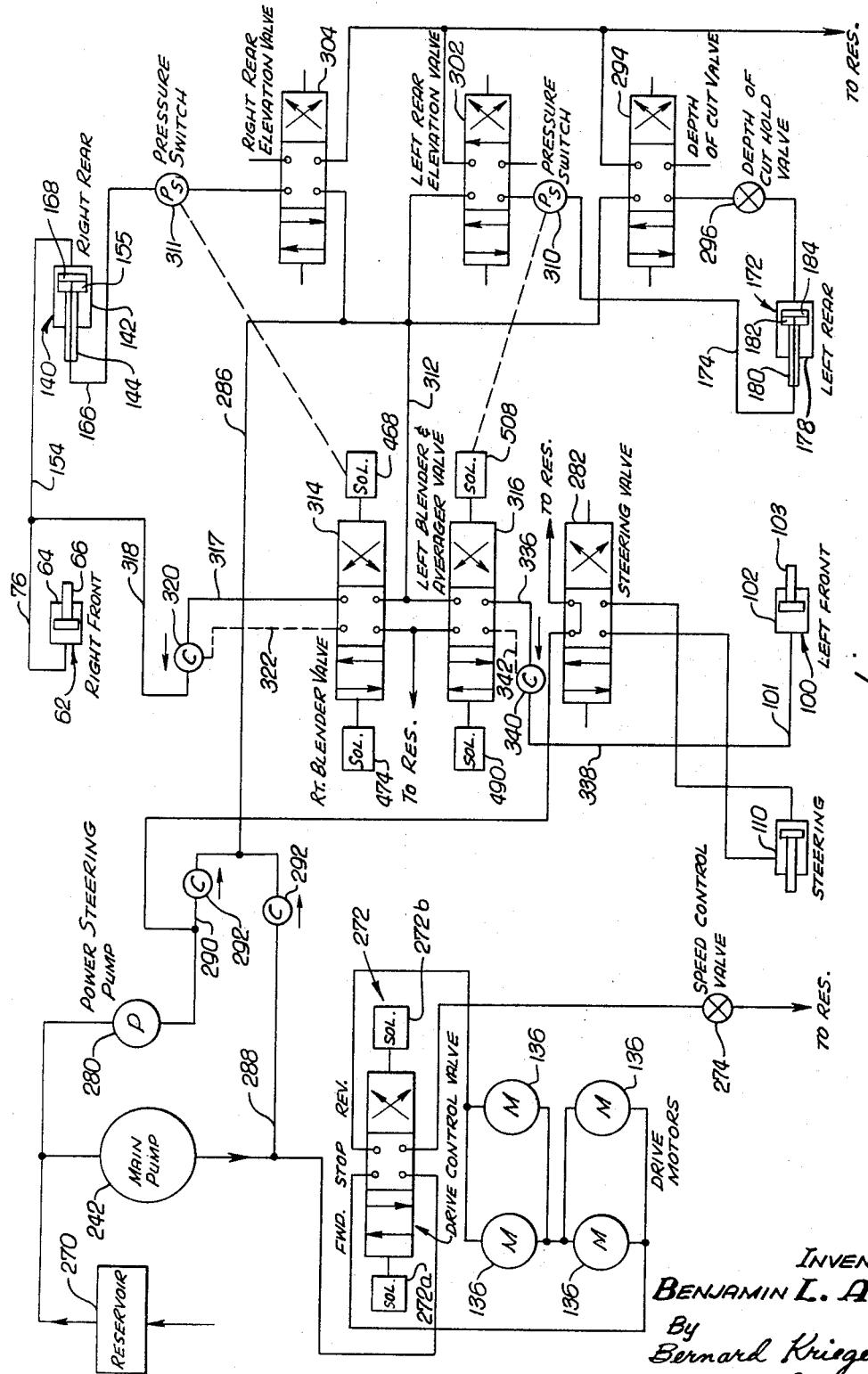

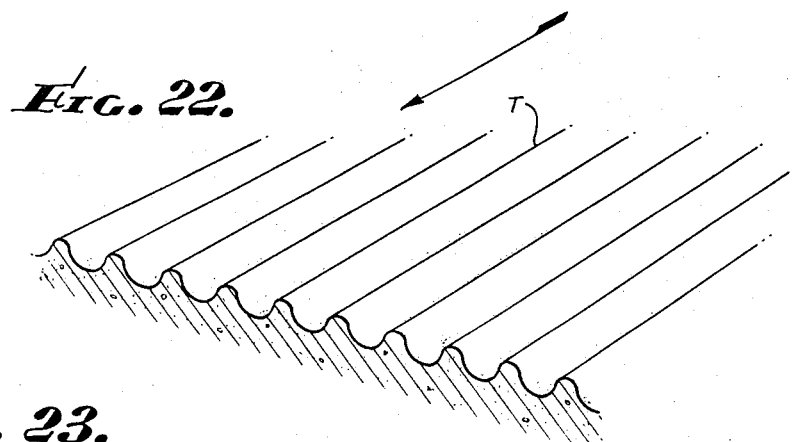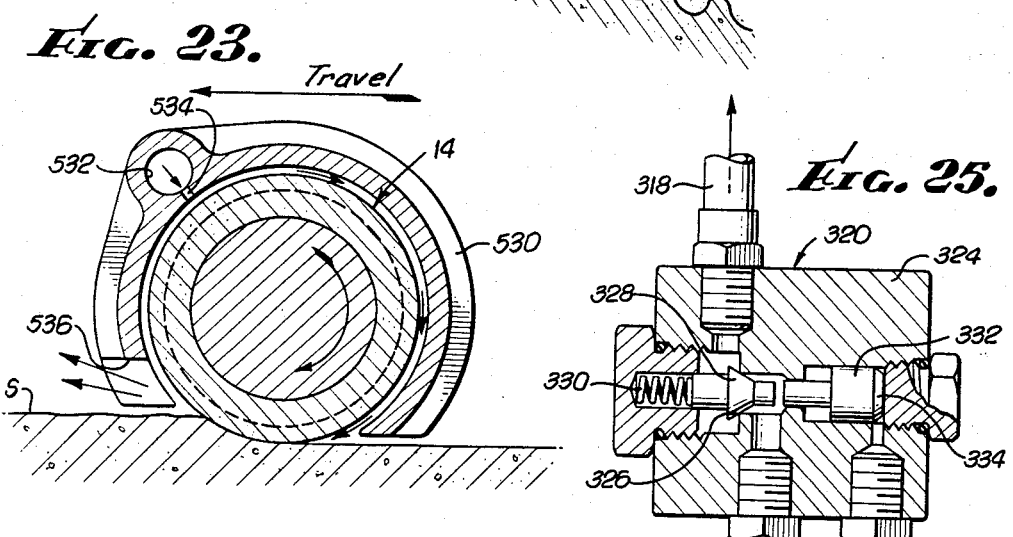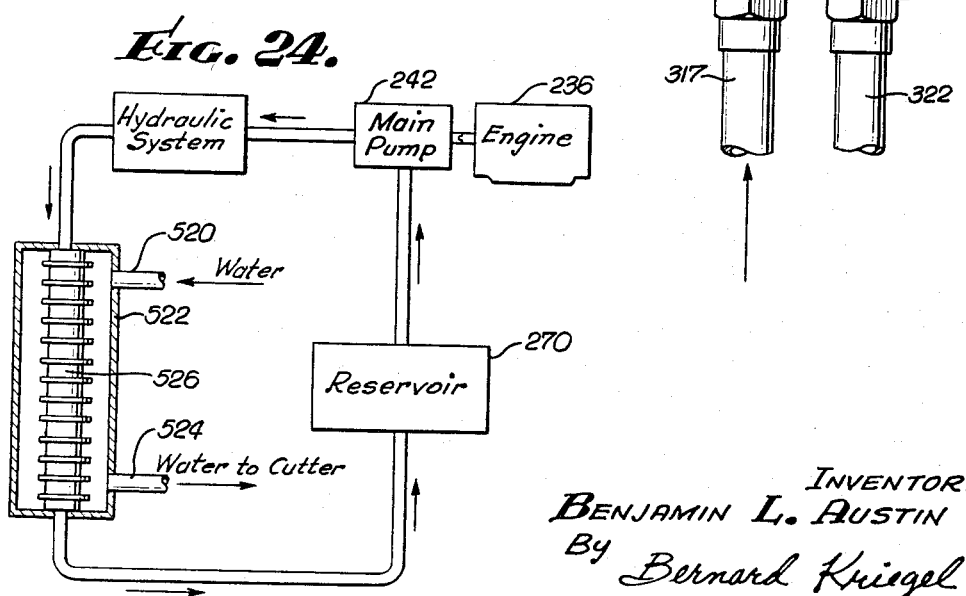

United States Patent Office 3,414,327
Patented Dec. 3, 1968

3,414,327
APPARATUS AND METHODS FOR CUTTING CONCRETE SURFACES
Benjamin L. Austin, Salt Lake City, Utah, assignor to Christensen Diamond Products Company, Salt Lake City, Utah, a corporation of Utah
Filed June 13, 1966, Ser. No. 557,039
46 Claims. (Cl. 299—1)

ABSTRACT OF THE DISCLOSURE

A wheeled frame supports a rotatable cutter for cutting concrete roadway surfaces to remove irregularities. A sensing device engages the roadway in advance of the frame and automatically effects vertical adjustment of the cutter ot determine the depth of cut in response to the profile of the roadway sensed by the device. A blender adjusts the height of one end of the cutter to correspond to the height of an adjacent previously cut surface. Another blender adjusts the height of the opposite end of the cutter to cause the cutter to take a light cut in roadway depressions so that the cutter operates upon the whole area of the roadway traversed by the cutter.

---

The present invention relates generally to cutting of concrete, and more particularly to apparatus and methods for rapidly and controllably levelling a concrete surface.

In the initial formation of concrete surfaces, such as streets, highways and aircraft runways, by currently used methods, such as by slip forming, the surfaces are somewhat uneven and irregular. Irregularities are undesriable because of the adverse effects they have on the ride provided by vehicles or aircraft moving over the surface. Bouncing and/or vibrations may be caused which present serious safety hazards, and also cause discomfort. Moreover, damage to the roadway or runway results.

Irregularity (or conversely smoothness) of a surface may be considered in terms of amplitude, i.e., overall height variation, as well as frequency, i.e., spacing of individual irregularities. In setting standards for streets, highways and runways, the specifications or construction tolerances of governmental bodies are often stated in terms of maximum amplitude or variation in height for a given distance. FIGURE 21 illustrates the profile of a typical roadway produced by slip forming; the broken lines $a$ and $b$ illustrate the application of such tolerances to such a profile. Thus, to meet specifications, at least the high portions which extend above the upper line $a$ must be removed.

The machines heretofore used to remove these high portions or bumps have not been fully satisfactory. Several forms of prior machines are shown in U.S. Letters Patents to Hatcher 2,990,660, 3,007,687, 3,037,755, 3,087,712, and Re. 25,838.

The machines disclosed in these patents are wheeled self-propelled vehicles that travel over the concrete surface to cut that surface. In general, they include a long two-section frame or body supported by a spaced pair of rear wheels and a single centrally located front wheel. A rotary cutter comprised of a series of circular saw blades is supported on the frame for rotation about a transversely extending horizontal axis. The cutter is located substantially closer to the rear support wheels than to the front support wheel so that a vertical movement of the front wheel as it passes over an irregularity in the concrete surface causes a smaller vertical movement of the cutter. A set of downwardly extendible elevating wheels is provided rearwardly of the cutter. Extension of these wheels raises the cutter off the ground to a non-operative position. To control the depth of cut, after it is determined by separate means that a particular high portion is to be removed or levelled, the cutter is manually set and locked at a determined height for the run. There is no provision for changing that height incident to the travel of the machine, although it could be changed for a new run. The long frames used in these machines, to so position the front support wheel spaced well ahead of the cutter, are necessarily quite flexible. Therefore, substantial deflection of the frames occurs when weight is transferred from the wheels to the cutter incident to a heavy cut, and it is impossible to accurately control the depth of cut. This limits the operation of such machines to light cuts, often requiring several runs over the same surface area, and limiting the speed at which the machine can travel while cutting. The effect is to severely limit the rate at which surfaces can be finished or brought within tolerances by these machines.

Since the height of the cutter in the prior machines is not adjustable incident to the travel of the machine, but rather, the high spots or portions are first located separately and the machine is adjusted and locked to position the cutter at a predetermined fixed elevation for a run or pass to remove the particular high portion, various problems result. Because the front wheel travels over a rough uncut surface, the height of the cutter varies from the predetermined elevation, depending on the irregularity of the surface. This makes it almost impossible to accurately match or blend with prior cuts or with any reference surface, such as an adjacent uncut surface. This fixed cutter height also results in an irregular appearance of the cut surface between areas that have been cut and adjacent uncut areas, such as low spots. This lack of uniformity also presents a safety hazard by affecting traction on the road surface and by creating sudden changes in the natural and reflective appearance of the concrete surface. Further, having to stop the machine for a change in cutter height and having to make hte change manually are time consuming and costly.

The operation of these machines also suffers from the use of a three-wheel support configuration, i.e., two wheels at the rear and a single wheel at the front of the machine. Vertical displacement of either of the two rear wheels causes the machine to pivot about the axis between the opposite rear wheel and the front wheel so that an upward movement of one of the rear wheels tends to cause a downward movement of the opposite end of the cutter.

Despite the use of long frames which severely limit the operation of these machines, the reduction in vertical movement transferred from the front wheel to the cutter is only about 1:3. Also, because the contact of the front wheel with the irregular uncut surface is only over a short tangent line, even very short duration irregularities are transmitted to the cutter, causing it to vary from the desired path. Therefore, while the surface is brought within the tolerance or height variation limits, the surface generated normally has a high frequency of irregularities.

Thus, the prior commercial concrete cutting machines, with their long flexible frames and manual adjustment of cutter height, are limited to light cuts, and the surfaces generated have frequent irregularities. The result is a high unit cost for the finished surfaces.

To meet these problems and others, a broad new approach was taken, as exemplified by the illustrated concrete planer shown in the drawings and described below. The long flexible frame was replaced by a short heavy and rigid frame which is able to resist deflection as the load transfers from the wheels to the cutter and therefore permits control over the cutter path for heavy cuts. Control of the cutter elevation was separated from the frame and the support wheels and was made automatic in response to sensing means that engage the concrete surface incident to the travel of the planer over the surface. A four-wheel hydraulically controlled support means was provided that, in effect, makes the elevation of the two ends of the cutter independent of one another.

More specifically, a forwardly extending sensor senses changes in the height in profile of the surface in the path of the cutter and operates a hydraulic system to change the height of the cutter in accordance with the sensed changes in height, so as to produce proportionally smaller changes in the height of the cutter. This produces a generally smooth or plane surface. In addition, the height sensed by the illustrated sensor is an averaged value over a substantial length of the concrete surface in front of the cutter to make the surface generated still smoother or flatter by reducing the effect on the cutter of short duration irregularities. Blenders at each side of the planer follow the profile of certain areas of the surface and each operates the hydraulic system to change the height of the cutter in accordance with changes in the engaged surface. One blender blends the instant cut with the adjacent surface area, which may comprise a previous cut or an uncut surface. Both blenders cause the cutter to follow the surface being cut down into depressions or holes to at least graze or cut the depressed surface and thereby provide an uninterrupted, substantially uniformly appearing cut surface along the entire length of the roadway traversed by the machine.

The result has been the cutting of concrete surfaces by as much as 5/8 inch at a time and at relatively rapid rates of planer travel. This produced a marked increase in the rate at which such surfaces could be brought within required construction tolerances, with associated savings in time and money. The cutter followed a more level cutting path, the amount of material removed to bring the surface within the required tolerances being minimized. Further, the cut surface was generally planer and had less frequent irregularities for improved riding and safety characteristics.

Accordingly, it is a principal object of the present invention to provide novel and improved apparatus and method for cutting the surface of a roadway or runway, particularly one made of concrete.

It is another object of the invention to perform heavy cuts at a relatively rapid rate while maintaining adequate control over the cut surface.

Another object of the invention is to provide such an apparatus in the form of a vehicle that has a relatively short, heavy and rigid cutter-carrying frame and an extension that, in effect, minimizes vertical movement of the cutter in response to surface irregularities to approximate the limited response achieved by use of a substantially longer frame.

It is another object of the invention to provide such an apparatus with sensing means that automatically controls the elevation of the cutter.

It is another object of the invention to provide such an apparatus with forwardly extending sensing means which notes changes in the height or profile of the surface in the path of the cutter and produces proportionally smaller changes in the height of the cutter.

A further object of the invention is to provide an apparatus and method that uses an averaged height of a substantial length of the surface in advance of the cutter to minimize the effect of short duration irregularities on the height of the cutter to produce a relatively flat cut surface.

It is a further object of the invention to provide an apparatus and method that brings a concrete surface within construction tolerances while removing only a minimum of material.

Yet a further object of the invention is to provide an apparatus and method that blends the surface being cut into an adjacent surface.

It is a further object of the invention to provide an apparatus and method that produces a generally continuous uninterrupted cut surface which extends into depressions or low spots in the roadway or runway.

Still a further object of the invention is to provide an apparatus that produces such cut surfaces continuously and automatically.

Another object of the invention is to support the apparatus in such manner that each end of the cutter is effectively independent in its vertical movement of the other end.

Still another object of the invention is to couple the front and rear support wheels at one side of the apparatus so that they automatically act as a trunnion, whereby vertical movement of one wheel causes the opposite vertical movement of the other wheel, the cutter, which is centered between the front and rear wheels, being maintained at predetermined height.

An additional object of the invention is to provide an apparatus that employs the same liquid for cleaning and cooling the cutter and for flushing away the cuttings produced thereby for the added purpose of cooling the hydraulic fluid used in the hydraulic system of the apparatus.

It is another object of the invention to provide an apparatus which is relatively simple, economical to manufacture and maintain, and yet which is effective, durable and dependable in operation.

This invention possesses many other advantages and has other objects which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is top plan view of a concrete surface planer embodying the invention, illustrated as cutting a strip adjacent to a previously cut strip;

FIG. 2 is a side elevational view of the planer shown in FIGURE 1 on a reduced scale;

FIG. 3 is an enlarged schematic illustration of the position of the cutter for successive cuts;

FIG. 4 is a side elevational view of the planer shown in FIG. 1;

FIG. 5 is an enlarged side elevational view of portions of the averaging mechanism of the planer;

FIG. 6 is an enlarged cross-section taken generally along line 6—6 of FIG. 5;

FIG. 7 is an enlarged side elevational view of the main portion of the planer;

FIG. 9 is top plan view of portions of the planer, parts being removed and broken away to illustrate certain portions of the mechanism;

FIG. 10 is an enlarged view of part of the planer, showing particularly the depth-of-cut indicating mechanism;

FIG. 11 is an enlarged sectional view taken generally along line 11—11 of FIG. 10;

FIG. 12 is an enlarged section taken generally along line 12—12 of FIG. 7, showing particularly the cutter and cutter gear box of the planer;

FIG. 13 is an enlarged side view, partially broken away and in section, showing the right front wheel construction of the planer;

FIG. 14 is an enlarged side view, partially broken away and in section, showing the right rear wheel construction of the planer;

FIG. 15 is a plan and sectional view, on an enlarged scale, taken generally along line 15—15 of FIG. 14, showing particularly the drive for a rear wheel;

FIG. 19 is a schematic representation of the control panel of the planer and of the support wheel assemblies, the elevation control devices, the cutter, and portions of the sensing and control mechanism;

FIG. 20 is a schematic and diagrammatic representation of the hydraulic system of the planer;

FIG. 21 is a schematic representation of a profile section through a typical roadway, illustrating typical cuts made by a planer with and without the use of the averaging mechanism;

FIG. 22 is an isometric representation of a section of highway cut and having a safety-grooved upper surface;

FIG. 23 is an enlarged schematic side sectional view taken generally along line 23—23 of FIG. 12, showing the flow of coolant around the cutter;

FIG. 24 is a schematic and diagrammatic representation of the cooling system of the planer for the hydraulic liquid; and FIG. 25 is a sectional view of a pilot-operated directional control valve used in the hydraulic system of the planer.

Figure 8:
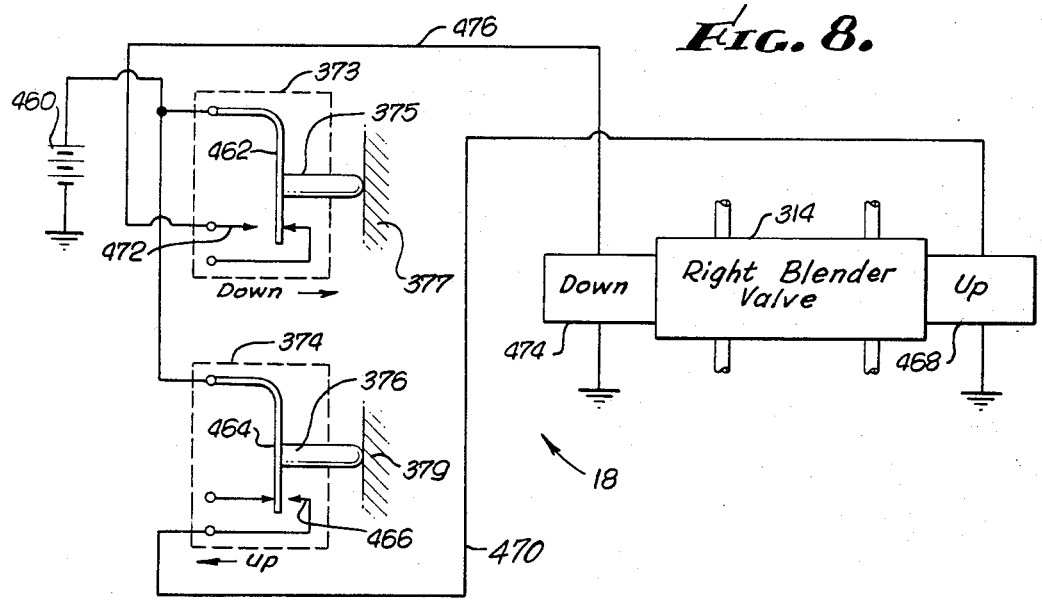
FIG. 8 is a schematic and diagrammatic illustration of portions of the right side elevation control of the planer.

Briefly, the illustrated concrete planer 10 is a self-propelled wheeled vehicle adapted to travel over a concrete surface S to be cut and to automatically operate to remove material from the surface to level the surface and to bring it within construction tolerances in a minimum of time and at a minimum cost. The planer 10 comprises a heavy, rigid frame 12 which supports an elongated cutter 14 for rotation about a fixed transversely extending axis. The frame 12 is supported at each corner by a support wheel assembly 16 which is controlled by elevation control means 18 to adjust the elevation of the frame. In this connection, the support wheel assemblies 16 are each controlled by a hydraulically operated cylinder and piston device 62, 100, 140, 172 to effect generally independent support and elevation or height control of each corner of the frame to thereby control the elevation of the cutter. In effect, the elevation of each end of the cutter can be controlled in this manner independently of the elevation of the other end of the cutter. The elevation control means 18 is operated to automatically correct the elevation of the cutter incident to travel of the planer. The planer is provided with a sensing mechanism or means 20 for sensing information correlated with the profile or contour of the surface to be generated and to operating the control device in accordance with that information to control the character of the surface generated. The sensing mechanism 20 of the planer includes an averaging mechanism 26 that extends forwardly of the cutter and the frame 12 to continuously sense and average the height of the concrete surface over a substantial length in advance of the cutter. The averaging mechanism 26 controls the elevation of the cutter in accordance with averaged elevation of the surface in advance of it, to cause the cutter to generate a generally level surface. The sensing mechanism 20 also includes a pair of blending mechanisms 28 and 30, one at either side of the planer. The right blending mechanism 28 controls the height of the right end of the cutter to conform or blend the right side of the surface being generated with an adjacent surface, while the left blending mechanism 30 controls the height of the left end of the cutter to conform or blend the left side of the surface being generated with certain depressions appearing in the surface.

The frame, base or body 12, shown best in FIGURES 7 and 9, is an elongated, one-piece, massive, rigid, generally rectangular shaped, cast iron casting. The frame is sufficiently bulky and strong to resist deformation incident to the cutting by the planer, particularly when weight is shifted from the wheels of the planer to the cutter. The weight of the frame and its relatively short length contribute substantially to the ability of the illustrated planer to make heavy cuts with accurate control over the amount of cut. Various elements of the planer are supported upon the frame, as will be described more fully below. The overall weight of the illustrated planer may, for example, be about 12,500 lbs.

The cutter 14 is a generally cylindrical solid rotary cutter mounted on the frame for rotation about a transversely extending axis fixed with respect to the frame. The cutter is positioned at the bottom center of the frame extending transversely from side-to-side and is disposed between the front and rear wheels 44, 114. As shown best in FIGURE 12, the cutter 14 is secured to a transversely extending horizontal cutter shaft assembly 200. The right end of the shaft assembly 200 is supported in a suitable bearing 202 mounted in an outboard bearing support 204 rigidly secured to the frame. The other or left end of the shaft assembly is rotatably supported by suitable bearings 206 and 208 in the lower end of a gear casing 210, which is rigidly fastened to the frame. The cutter extends sufficiently below the frame and other parts of the planer so that it may be lowered into cutting position without interference from the frame or other parts. The cutter itself is rigid and it is rigidly supported on the frame so that the cutting forces are transferred directly to the frame incident to the cutting operation of the planer.

Any suitable rotatable cutter of generally cylindrical form can be used, such as the cutter assembly illustrated and described more fully in the copending United States patent application of Frank L. Christensen and Donald H. Mabey, Ser. No. 345,425, filed Feb. 17, 1964, Patent No. 3,306,669. This cutter may comprise a tungsten carbide matrix 212 in which diamond cutting elements 214 are set, as in the crests of parallel circular cutter ribs 212a.

The left end of the cutter shaft assembly 200, which extends into the lower end of the gear casing 210, has an output gear 216 secured to it. An idler gear 218 is mounted on an idler shaft 220 centrally of the gear casing for engagement with the output gear 216 and for engagement with an input gear or pinion 222 mounted on a suitable shaft assembly 224 at the upper end of the gear casing. The input gear shaft assembly 224 is connected to a double universal joint 226 connected to a shaft 228 of a right angle drive mechanism 230 mounted on the frame. As shown in FIGURE 9, the right angle drive mechanism 230, which may comprise meshing bevel gears (not shown), is powered by a suitable prime mover, such as an internal combustion engine 236 mounted on the frame. The engine 236 is drivably connected to a clutch 234 connected to a speed reducer 232, that is, in turn, connected to the right angle mechanism 230. As shown in FIGURE 9, the right angle drive mechanism 230 also has a direct line output shaft 238 connected through a flexible coupling 240 to a main hydraulic pump 242 mounted on the frame. The engine 236 operates the pump 242 and the cutter under the control of the clutch 234, which is engaged and disengaged by a clutch handle or lever 244 mounted on the frame. As will be explained more fully below, the main hydraulic pump 242 provides the hydraulic pressure to propel the planer and to adjust the height of the left and right sides of the frame, and thus of the left and right ends of the cutter 14.

As noted above, the frame is independently and adjustably supported at each of its four corners by one of the four support wheel assemblies 16. The planer includes right and left front support wheel assemblies 36 and 38 and right and left rear wheel assemblies 40 and 42. Each of these support wheel assemblies includes a solid support wheel for purposes of firmness and rigidity.

The two front support wheel assemblies are generally alike, and, therefore, only the right front support wheel assembly 36, shown best in FIGURE 13, will be described in detail. The assembly 36 includes a support wheel 44, which may be of metal, or which may have a non-rotatable tire, rotatably mounted between the downwardly depending legs 46 of a bifurcated front wheel fork 48. The front wheel fork 48 also includes an upwardly extending shaft section 50 supported for rotation about a vertical axis in a bearing housing 52 by two sets of vertically spaced bearings 54. The bearing housing 52 is mounted in a generally cylindrical sleeve section 56 at the outer end of an arcuate yoke arm 58 pivotally mounted at its inward end to the front end of the frame by a front support shaft 60 disposed in a forward bearing 32 of the frame.

The position of the pivoted yoke arm 58 relative to the frame is controlled by a hydraulically operated right front elevation control cylinder and piston device 62 which is pivotally interconnected between the frame and an intermediate portion of the yoke arm 58. The device 62 is disposed with its axis generally horizontal. It comprises generally a forwardly positioned cylinder 64 pivotally connected at its forward end to the yoke arm 58 and a rearwardly positioned piston structure 66 pivotally connected at its rearward end to the frame. Expansion of the cylinder and piston device 62 will cause the yoke arm 58 to pivot in a counterclockwise direction relative to the frame to effect elevation of that corner of the frame. Contraction of the cylinder and piston device will cause the yoke arm 58 to pivot in a clockwise direction relative to the frame, lowering that corner of the frame.

Figure 16:
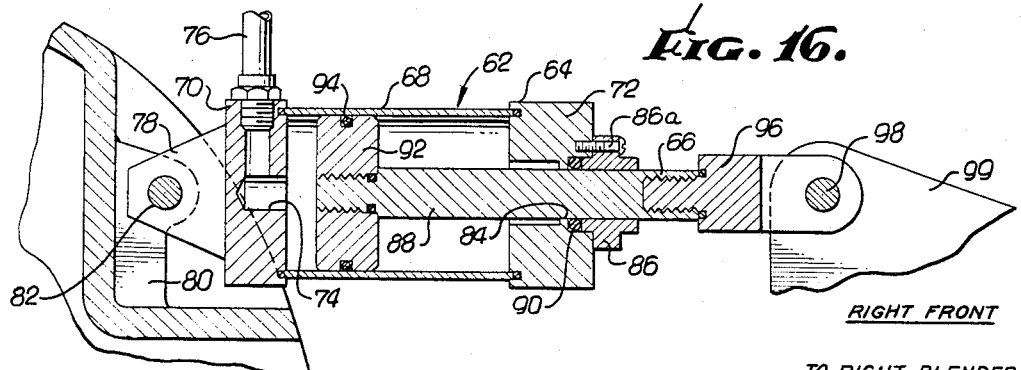
FIG. 16 is an enlarged sectional view of the right front elevation control device.

More particularly, as shown best in FIGURE 16, the cylinder 64 includes a cylinder sleeve 68 to which a head end 70 and a rod end 72 are secured. The head end 70 has a passageway 74 leading from the interior of the cylinder 64 to a hydraulic line 76. As shown best in FIGURES 9 and 16, vertical lugs or ears 78 extending forwardly from the head end 70 of the cylinder are pivotally connected to a vertical lug or ear 80 on the yoke arm 58 by a horizontal pivot pin 82. A central opening or passage 84 extends through the rod end 72 and through a cap 86 secured to the rod end 72 by screws 86a, or the like. The piston structure 66 includes a piston rod 88 slidably extending through the opening 84, an O-ring 90 being compressed between the cap 86 and rod end 72 of the cylinder to slidably seal against the piston rod 88. A piston 92 is secured to the forward end of the piston rod, being disposed within the cylinder sleeve 68 in sliding engagement with its wall. To prevent leakage past the piston, it carries a suitable piston ring 94 in slidable sealing engagement with the cylinder wall. The rearward end of the piston rod 88 is threadably secured to a connector element 96, which is pivotally connected by a horizontal pin 98 to a wing 99 on the adjacent frame.

In operation, hydraulic fluid under pressure is introduced into the cylinder and piston device 62 through the line 76 to extend the device and elevate the adjacent corner of the frame, as noted above. A portion of the weight of the planer is thus supported by the extended cylinder and piston device. By subsequently permitting fluid to exhaust from the cylinder 64 through the line 76, the corner of the frame is permitted to lower or settle downwardly.

The left front elevation control cylinder and piston device 100, which is not shown in detail, is generally like the front right cylinder and piston device 62. The hydraulic device 100 comprises a cylinder 102 and a piston structure 103 and is connected to a hydraulic line 101.

As shown in FIGURES 9 and 13, a steering arm 104 extends rearwardly from each of the front wheel forks 48 immediately above the associated front wheel 44. A transversely extending steering tie rod 105 is pivotally connected at its ends to the rear ends of the steering arms 104 to interconnect the two front support wheel assemblies 36 and 38. Thus, turning one front wheel and its associated fork will turn the other front wheel. As shown in FIGURE 9, the left front wheel fork also includes an inwardly directed steering extension 106 pivotally connected to the forward end of a piston rod 108 suitably connected to a piston 108a slidable in a steering cylinder 110 pivotally connected adjacent its rearward end to the frame 12. Introduction of fluid under pressure selectively into each end of the cylinder 110 effects corresponding shifting of the piston in the cylinder and turning of the front wheels in one direction or the other, to steer the planer.

The two rear support wheel assemblies 40, 42 are generally similar and, therefore, only the right rear support wheel assembly 40 need be described in detail. As shown best in FIGURES 9, 14 and 15, a solid rear support wheel 114 is rotatably supported at the outer or rearward end of a horizontally extending section 116 of a generally L-shaped rear wheel yoke arm 118. The yoke arm 118, which also includes a generally vertically extending section 120 that extends upwardly from the forward end of the horizontal section, is pivotally mounted at the junction of the sections on a transversely extending, generally horizontal rear support shaft 122 disposed in a rear bearing 34 of the frame. As illustrated best in FIGURES 14 and 15, the rear end of the horizontal section 116 is bifurcated to define a vertically extending slot in which the rear wheel 114 is received.

The rear wheel is provided with a circumferentially sectioned wear shoe on tire 124 and is rotatably supported through the agency of bearings 128 on a transversely extending horizontal rear wheel shaft 126 that extends between the bifurcations of the horizontal section 116. The inner face of each rear wheel 114 is provided with an annular recess intermediate its rim and hub portions in which an internal ring gear 130 is secured adjacent the rim portion of the wheel. A pair of drive pinions 132 is disposed with one pinion on either side of the rear wheel shaft 126 in driving engagement with the ring gear 130, each drive pinion 132 being connected to a driving shaft 134 of a reversible hydraulic motor 136 suitably secured to the inner side of the yoke arm 118. Each shaft 134 and its associated pinion are rotatably supported by the yoke arm 118 through the agency of suitable bearings 138. To propel the planer forwardly or rearwardly, the two reversible hydraulic motors for each wheel are rotated in the desired direction to correspondingly rotate the drive pinions 132, ring gears 130, and the rear wheels 114.

The vertical section 120 of the rear wheel yoke arm 118 is pivotally connected to one end of a hydraulically operated right rear elevation control device 140 that is pivotally connected at its other end to the frame 12 of the planer. Expansion or contraction of the elevation device 140 serves to pivot the rear wheel yoke arm 118 and effect raising or lowering of the right rear corner of the frame.

Figure 17:
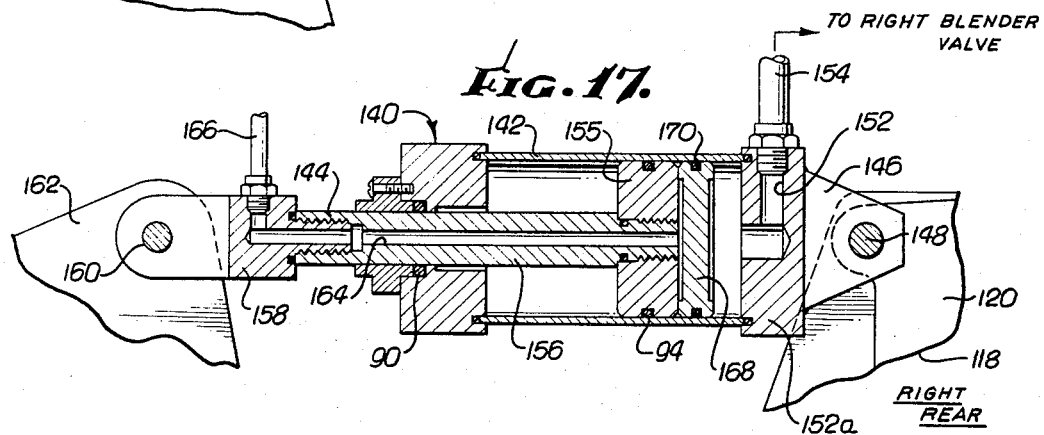
FIG. 17 is an enlarged sectional view of the right rear elevation control device.

The right rear elevation control device 140, which is illustrated in detail in FIGURE 17, is similar in construction to the front elevation control devices with certain differences which will now be described. It includes a cylinder 142 disposed rearwardly of a piston structure 144. The cylinder 142 is pivotally connected by means of vertical lugs or ears 146 at its rear end and a horizontal transverse pin 148 to the vertical section 120. A passageway 152 in the cylinder head end 152a leads from the interior of the cylinder at its head end to a hydraulic line 154. The piston structure 144 includes a piston rod 156 connected to a piston 155 and to a connector element 158 pivotally connected by a transverse horizontal pin 160 to a vertical wing 162 on the adjacent frame 12. A passageway 164 extends through the center of the piston rod 156, through the piston 155, and through the connector element 158, to place the interior area of the cylinder immediately rearwardly of the piston 155 in communication with a hydraulic line 166. A generally disc-shaped floating adjusting piston 168 is disposed in a sliding fit within the cylinder rearwardly of the piston 155, the adjusting piston 168 being provided with a suitable piston ring 170 slidably sealing against the cylinder wall. Similarly, the piston 155 and piston rod 156 have sealing devices 94, 90 associated therewith akin to the seals of the front device 62.

Figure 18:
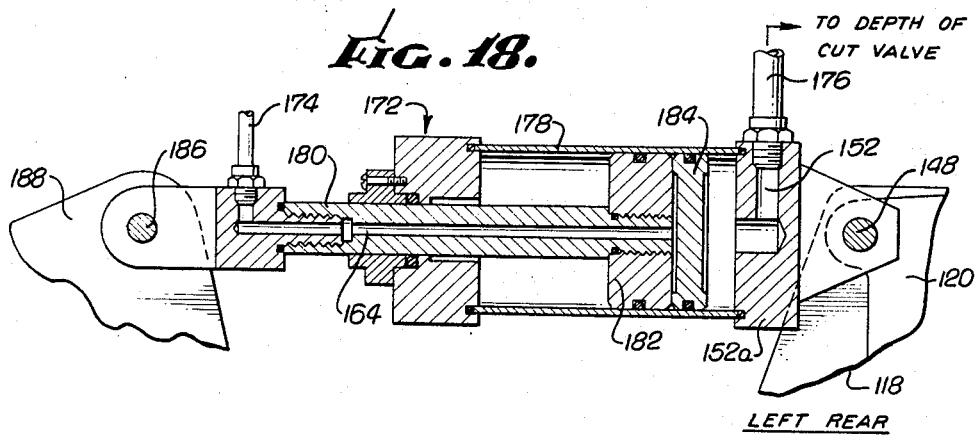
FIG. 18 is a sectional view of the left rear elevation control device.

A left rear elevation control device 172, shown in detail in FIGURE 18, is similar to the right rear device 140, having a cylinder 178, a piston structure 180, a piston 182 and a floating adjusting piston 184. The forward end of the piston is pivotally connected by a pin 186 to a wing 188 on the frame 12. The cylinder head end 152a is connected to the left yoke arm 118 through the pin 148. The interior area of the cylinder 178 immediately rearwardly of the piston 182 is connected to a hydraulic line 174, through the passage 164, and the interior of the cylinder immediately rearwardly of the adjusting piston 184 is in communication with a hydraulic line 176 through the passage 152 in the cylinder head end 152a.

It will be noted that each of the rear cylinder and piston devices 140, 172 may be expanded to elevate the associated corner of the frame by forcing hydraulic fluid into it through either of its hydraulic lines, and allowing fluid to exhaust from a cylinder through either of these lines will permit the associated cylinder and piston device to contract and the associated corner of the frame 12 to lower by gravity.

As will be explained more fully, the depth of cut made by the cutter 14 is normally determined by the height of the left rear of the frame, which is, in turn, determined by the condition of the left rear elevation control cylinder and piston device 172. As illustrated in FIGURE 18, the condition of the control device 172 is determined by the distance between the rear of the floating adjusting piston 184 and the rear wall of the cylinder 178. This distance is controlled by the operation of the hydraulic system, as will be explained.

As shown in FIGURES 9, 10, 11, a depth-of-cut indicating mechanism 250 is operated in response to the condition of the rear left elevation control device 172 to give readings that permit the depth of cut of the planer to be set at a desired value. More particularly, a support block 252 is mounted on the inwardly extended end of the pin 186 that pivotally connects the piston structure 180 of the rear left device 172 to the frame. The support block 252 rotatably supports a vertical pin 254, the upper end of which is secured to the apex of a depth-of-cut dial 256, which is generally sector-shaped. The dial 256 is disposed generally horizontally and extends inwardly of the planer. An elongated pointer 258 is secured to the support block 252 beneath the dial and extends outwardly beyond the circular free edge of the dial, the outer end of the pointer 258 being turned upwardly and then inwardly to overlie a scale 260 marked in ⅛ inch or other suitable increments along the free edge of the dial. The support block 252 is recessed around the lower end of the vertical shaft 254, and a follower element 262 is secured to that lower end of the shaft. The follower element 262 extends outwardly of the planer away from the dial, engaging an end of a rod 264 slidable in a support block 266, the opposite end of the rod 264 abutting a forwardly directed surface of the cylinder 178. A tension spring 268 is connected to the dial 256 and the frame 12 to urge the dial follower element 262 rearwardly against the rod 264 and the rod against the cylinder 178. Thus, the dial 256 is moved in response to movement of the left rear cylinder and piston device 172.

The hydraulic system and its relationship to the cutter elevation control system are diagrammatically and schematically illustrated in FIGURES 19 and 20. The main hydraulic pump 242, which as noted above is driven by the engine 236, is connected to a reservoir 270 adapted to contain hydraulic fluid and supported on a rearward extension of the frame above the rear wheels (FIGURES 4 and 7). The main hydraulic pump 242 is also connected through a reversible solenoid-operated planer travel direction control valve 272 to the hydraulic drive motors 136 for the rear support wheels 114. The hydraulic drive motors 136 are also connected through the travel direction control valve 272 and through a speed control or throttle valve 274 back to the reservoir 270. As illustrated schematically in FIGURE 20, the travel direction control valve 272 comprises generally a movable valve element having three positions: a center null position, where no hydraulic fluid passes through the valve; and left and right positions where the fluid passes through the valve as indicated by the arrows. A pair of solenoids 272a, 272b are selectively energized or de-energized to control the position of the valve 272. When the solenoid 272b is energized, the control valve 272 is shifted to the right and the main hydraulic pump drives the motors 136 for forward movement of the planer, while, when the solenoid 272a is energized the valve is shifted to the left and the flow through the motors 136 is reversed so that the planer is moved rearwardly. In both conditions, the motors are permitted to exhaust through the speed control valve 274 to the reservoir 270. As shown in FIGURE 19, the speed control valve 274 is located on a control panel 276 of the planer as are the stop, reverse, and forward controls 277 for the travel direction control valve 272. A pump pressure control 278 which controls the drive force on the wheels is also located on the control panel.

An engine driven power steering pump 280 is also connected to the reservoir and then connected through a three-position steering control valve 282 to the steering cylinder 110 (FIGURE 9), which is also connected through the steering control valve 282 to the reservoir. By operating the steering control valve 282 in one direction or the other through a steering control lever 284 on the control panel, pressure is applied to one end or the other of the steering cylinder 110, while the opposite end is connected to the reservoir 270.

The main hydraulic pump 242 and the power steering pump 280 are also connected through a common input line 286 to the four elevation control cylinders 64, 142, 102, 178. Feeder input lines 288 and 290 are respectively connected between the pumps 242 and 280 and the common input line 286, and a one-way directional flow valve 292 is placed in each feeder input line to prevent reverse flow back to the pumps. The common input line 286 is connected to the left rear elevation control cylinder 178 through a three-position depth-of-cut control valve 294. Operation of the depth-of-cut control valve 294 to the right provides communication between the input line 286 and the cylinder interior region between the adjusting piston 184 and cylinder head end 152a to expand the cylinder and piston device 172 and raise the left rear corner of the frame 12. Operation of the depth-of-cut control valve 294 to the left connects the cylinder head passage 152 to the reservoir 270 and permits the cylinder and piston device 172 to contract and the left rear corner of the frame to lower. A depth-of-cut hold valve 296 is provided in the line 176 between the head end of the cylinder 178 and the depth-of-cut control valve 294 to ensure that a desired amount of fluid is retained or trapped rearwardly of the adjusting piston 184. The depth-of-cut control valve 294 and the depth-of-cut hold valve 296 are operated by suitable manually operated controls 298 and 300 located at the control panel 276.

The common input line 286 is also connected through right and left rear elevation valves 304 and 302 to the right and left rear elevation control cylinders 142 and 178, respectively, for lifting the cutter 14 completely away from the concrete surface to permit non-cutting movement of the planer over the surface. More particularly, the left rear elevation valve 302 is operable through a suitable control lever 306 located on the control panel to move to the right to connect the input line 286 to the line 174 and thus through the passage 183 to the region of the left rear elevation control cylinder 178 between the adjusting piston 184 and the piston 182. This serves to expand the cylinder and piston device 172 and elevates the left rear corner of the frame 12. Movement of the left rear elevation valve 302 in the opposite direction, or to the left, connects the region of the cylinder 178 between the pistons 184, 182 to the reservoir 270 and permits the left rear corner of the frame 12 to lower.

The right rear elevation valve 304 is operated by a control lever 308 at the control panel to move to the right to connect the input line 286 to the line 166 and thus to the interior region of the right rear elevation control cylinder 142 between the adjusting piston 168 and the piston 155. This effects shifting of the piston 155 in the cylinder 142, and, in effect, expands the device 140, elevating the right rear corner of the frame. Movement of the valve 304 to the left exhausts fluid from between the pistons 155, 168 and allows gravity to lower the right rear corner of the frame.

Pressure switches 310 and 311 are interposed in the respective lines between the rear elevation valves 302 and 304 and their associated rear elevation control cylinders 178 and 142. The function of these switches will be explained below.

The pumps 242 and 280 are further connected through a branch line 312 of the common input line 286 and through a solenoid operated three-position right side blender or control valve 314 to both right side elevation control cylinders 64 and 142. The pumps are similarly connected through the line 312 and through a left blender and average valve 316 to the left front elevation control cylinder 102. The right and left side control valves 314 and 316 are operated by controls 313 and 315, respectively, on the control panel 276. Each control 313, 315 has an "of" position, and "up" position and an automatic operation position.

The right side control valve 314 connects through lines 317, 318 and 76 to the head end of the right front cylinder 64. The lines 317 and 318 also connect the right side control valve 314 through the line 154 to the head end of the cylinder 142 rearwardly of the floating piston 168. Movement of the right side control valve 314 to the right puts the line 312 in communication with lines 317 and 318, and thereby causes both right side cylinder and piston devices 62, 140 to extend to raise the right side of the frame 12.

A pilot operated directional flow valve or check valve 320 is provided at the connection between lines 317 and 318. A pilot control line 322 is connected between the directional flow valve 320 and the control valve 314. The control valve 314 is also connected to the reservoir 270. In general, the directional flow valve 320 permits flow only from the pumps to the right side cylinders 64, 142 through the lines 317 and 318 when the right side control valve 314 is moved to the right, as seen in FIG. 20. The valve 320 permits reverse flow from the right side cylinders through he lines 318 and 317 to the reservoir when the valve 314 is moved to the left.

A typical form of pilot controlled directional flow valve 320 is shown in detail in FIGURE 25. It includes a body 324 defining a flow passage between the lines 317 and 318. The body 324 has a valve seat 326 surrounding the flow passageway, and a one-way valve element 328 is biased, as by means of a spring 330, to engage the seat 326 and close the valve 320 against reverse flow of fluid. The seat and the valve element are constructed and arranged so that the inward flow from the pumps through line 317 tends to open the valve element 328 against the spring force, while opposite flow from the cylinders 64 and 142 seats the valve element 328 and thereby closes the valve to prevent flow in that direction. The valve element 328 is engageable by a pilot or piston element 332 slidably supported in the body 324, with its outer face 334 in communication with the pilot control line 322. When hydraulic pressure is provided within the pilot control line 322, it acts upon the pilot or piston element 332 to shift it against the valve element 328 and move the latter from its seat against the force of the spring 330 and the hydraulic pressure in the line 318, communicating the line 318 with the line 317 and allowing reverse flow of fluid from the line 318 to the line 317.

Referring again to FIGURE 20, it will be noted that movement of the right side control valve 314 to the left connects the pilot control line 322 to pump pressure while placing line 317 in communication with the reservoir. The valve 320 is thereby operated to permit the flow from the right cylinders 64, 142 through the lines 318, 317 to the reservoir 270. This results in contraction of the right cylinder and piston devices 62, 140 and lowering the right side of the frame 12.

It will be noted that the connection 286, 312, 317, 318 from the pumps 242, 280 is to lines 76, 154 interconnecting the right front elevation control cylinder 64 with the right rear elevation control cylinder 142. When the right side cylinders and piston devices 62, 140 are connected to the pumps or to the reservoir they act generally together i.e. both expanding or contracting substantially the same amount. However, when the right side control valve 314 is closed, the right side devices 62, 140 are so interconnected that extension of one device results in contraction of the other, and vice versa. Thus, the elevation control cylinder and piston devices 62, 140 on the right of the planer are hydraulically coupled, being in general the hydraulic equivalent of a mechanical trunnion. In other words, conditions tending to elevate or lower one right side wheel tend to cause the opposite effect on the other right side wheel. Because of this and the substantially equal spacing of the cutter 14 intermediate the front and rear support wheels, the right end of the cutter tends to remain at a level which is independent of raising or lowering of either of the right wheels as a result of their rolling along the surface of the roadbed.

The input line 312 from the pumps is connected through the left side control valve 316, line 336, a pilot operated directional flow or check valve 340, and line 338, to the head end of the left front elevational control cylinder 102. The pilot control valve 340 is also connected to the left side control valve 316 through a pilot control line 342, so that movement of the valve 316 to the left causes opening of the directional flow valve 340, in the same manner as the valve 320, to permit reverse flow from the left front cylinder 102 to the reservoir 270 permitting gravity lowering of the left front end of the frame 12.

The right and left side control valves 314 and 316 operate to either extend or contract the various elevation control cylinder and piston devices 62, 140 and 100 to which they are connected to control the height of the right and left ends of the cutter 14.

The sensing mechanism 20 for sensing information correlated with the profile of the surface to be generated, for controlling the elevation of the cutter 14, includes, as noted above, the right side blending mechanism 28 (FIG. 19), the left side blending mechanism 30, and the averaging mechanism 26.

The right side blending mechanism 28 and the left side blending mechanism 30 are generally similar in construction, so only the left side blending mechanism 30 will be described in detail. As shown in FIGURE 7, the left blending mechanism 30, which is positioned at the left of the planer immediately in front of the cutter 14, includes a generally elongated blender shoe 350 extending longitudinally of the planer and slidable along the concrete surface S. The forward and rearward ends of the blender shoe 350 are turned upwardly to facilitate its movement over the concrete surface, and to minimize any chance for the blender shoe becoming caught or jammed incident to travel of the planer. The blender shoe is provided with an upwardly extending post 352 adjacent its rearward end pin-connected to a lower arm 354 of a bell crank lever 358 pivotally mounted on the frame, the other arm 356 of the lever 358 extending generally upwardly.

A pair of microswitches 360 and 362 are pivotally supported in vertically stacked position on the outer end of the upwardly extending arm 356, the microswitches 360 and 362 having actuator pins 364 and 366, respectively, extending rearwardly. The microswitches may be of generally standard construction with the actuator pins biased to an outward position. A pair of adjustable microswitch stop screws 368 and 370 are supported in horizontally extending positions on the machine frame 12 to respectively engage the pins 364 and 366 of the microswitches. The stop screws 368 and 370 are threaded through a transversely extending vertical plate 372 supported on the frame, so that by turning the stop screws, they are adjusted toward or away from the microswitch pins. The weight of the blender shoe 350 and of the rearwardly extending arm 354 is relied upon to pivot the latter in a clockwise direction to urge the microswitch pins 364, 366 against the stop screws 368, 370 when the concrete surface S allows the shoe 350 to lower, relative to the frame 12. Elevation of the shoe 350 by the surface S pivots the bellcrank lever 358 in a counterclockwise direction to remove the microswitch pins 364, 366 away from the stop screws 368, 370. Thus, the vertical position of the shoe 350 as it slides over the surface S determines the open and closed conditions of the microswitches.

The right side blending mechanism 28 (FIGS. 8, 19) has a surface following blender shoe 350a generally similar to blender shoe 350. A pair of microswitches 373 and 374 are mounted on the bellcrank of the blending mechanism 28. The microswitches 373 and 374 have pins 375 and 376 that are engagable with stop screws 377 and 379.

The averaging mechanism 26 is shown in its entirety in FIGURES 1, 2, 4 and 5. In general, it includes an elongated lever structure 378 that comprises a rear section 380 pivotally supported on the forward end of the frame 12 and connected to a forwardly extending boom section 382 which reaches a substantial distance forwardly of the cutter 14 and the frame 12. A wheeled articulated sensing-and-averaging device 384, which is adapted to ride along the uncut surface in front of the planer, is pivotally connected to and supports the forward end of the boom section 382. The pivoting of the lever structure 378 in response to an averaged height of the surface over which the device 384 extends contributes to the control of the cutter height.

Considering the averaging mechanism 26 more particularly, the lever section 380 is pivotally mounted at the left side of the planer on the front support shaft 60 on which the left front wheel yoke 58 is pivotally mounted. The section 380 is generally an elongated horizontally extending vertical plate having an arm 386 extending generally rearwardly from the pivot 60 and an arm 388 which extends in an arc or curve generally forwardly and upwardly from the pivot 60. The arm 388 may generally approximate the shape of the left front wheel yoke 58, except that it extends further forwardly. As shown best in FIGURES 1 and 5, the elongated boom section 382 is connected by a vertical hinge 390 to the forward end of the arm 388 for movement about a generally vertical axis to permit the boom section 382 and the sensing-and-averaging device 384 to be swung outwardly and back against the left side of the planer for compact transportation and storage.

The hinge 390 may assume any desired form. As shown, it includes a vertical plate 392 secured to the lever section 380 and supporting a transversely extending vertical abutment plate 394. The hinge 390 also includes a second transversely extending vertical abutment plate 396 secured to the rear end of the boom section 382 by means of a forwardly extending spaced pair of connection plates 398. The abutment plates 394 and 396 are pivotally connected to each other, at their outer or far-left edges, by a vertical hinge pin 400. Suitable latch means (not shown) are provided to keep the abutment plates in the abutting position shown in the drawings, which maintains the boom section 382 in the forwardly extending operative position.

The boom section 382 comprises a pair of elongate channel-shaped beams 402 bolted to one another by upper transverse, spaced plates 404 and 406. The boom section 382 is pivotally connected at its forward end to the center of an intermediate supporting lever 408 by means of a pivot pin 414 carried by a block 412 secured to the lever 408 by screws 416 passing through the lever and also through a reinforcing plate 418. The pivot pin 414 is rotatable in bearing supports 410 depending from and secured to the side beams 402 of the boom section 382.

As shown in FIGURE 5, a two-wheeled trunnion assembly 420 is pivotally connected at its center to each end of the intermediate supporting lever 408. Each assembly 420 includes a lower wheel support lever 424 pivoted at its midpoint to an end of the support lever 408 by a hinge pin 436 extending through a bearing support 430 secured to the lever 408 by screws 432 extending through a support plate 434, the pin 436 also extending through a support block 422 secured to the middle of the lever 424 by screws 426 passing through a support plate 428. A caster wheel assembly 438 is mounted on each end of the two wheel supports 424. Each caster wheel assembly includes a solid wheel 440 mounted for free rotation on a caster fork 442 supported at one end of the associated wheel support for swivel action about a vertical axis.

As shown, there are two assemblies 420, one assembly being pivotally connected to each end of the intermediate support lever 408.

Thus, four wheels 440 contact the uncut concrete surface S at longitudinally spaced points in front of the planer and produce a height for the forward end of the pivoted lever structure 378 which corresponds to the average elevation of the four wheels 440. A given variation in height of one of the caster wheels 440 causes only one-fourth of that variation in height at the forward end of the pivoted lever structure 378.

As shown in FIGURE 7, a pair of microswitches 444 and 446 are mounted side-by-side on the outer end of the rearwardly extending arm 386 of the lever structure 378, with their pins 448 and 450 extending upwardly and being biased to an upward position. A pair of stop screws 452 and 454 are adjustably threaded through a horizontal plate 456 fixed to and extending outwardly from the frame 12 to respectively engage the microswitch pins 448 and 450. Pivotal movement of the lever structure 378 abuts the microswitch pins against the stop screws to operate the microswitches. The positions of the stop screws may be adjusted relative to the microswitch pins 448, 450 by rotation of the stop screws, thereby threading them in the plate 456.

FIGURE 8 diagrammatically illustrates the right blender down and up microswitches 373 and 374 and an electrical circuit between these microswitches and the right side blender control valve 314. As noted above, the microswitches 373 and 374 are mounted for movement toward and away from their stop screws 377 and 379 in accordance with the lowering and raising, respectively, of the right blender shoe 350a. FIGURE 8 illustrates the neutral or null position of hte microswitches. An electrical power source 460 is connected to the arms 462 and 464 of each microswitch. The arms 462 and 464 are biased toward their respective stop screws 377 and 379 and carry the pins 375 and 376, which are thereby urged against the stop screws.

In the right blender up microswitch 374, an actuating contact 466 is normally spaced a short distance from the free end of the arm 464 on the same side of the arm as the stop screw 379. The contact 466 is connected to an up solenoid 468 of the right side control valve 314 through a line 470. When the surface over which the right blender shoe is riding rises, the shoe is raised to move the microswitches 373 and 374 away from their stops 377, 379, which causes, in particular, the biased microswitch arm 464 to engage the contact 466. This completes a circuit to the up solenoid 468 which operates the valve 314 to the right (FIGURE 20) to allow hydraulic fluid to be pumped through the lines 317, 318, 76, 154 into the cylinders 64, 142 to elevate the right side of the planer frame 12 and the right end of the cutter 14.

In the right blender down microswitch 373, an actuating contact 472 is normally positioned spaced a short distance from the free end of the arm 462 opposite the stop screw 377, and this spaced relation remains when the right blender shoe 350a moves up. The contact 472 is connected with a down solenoid 474 of the right side control valve 314 through a line 476. When the surface over which the right blender shoe is riding falls, the shoe drops by gravity to move the right blender microswitches against their stop screws 377, 379, which causes, in particular, the arm 462 to engage the contact 472. This completes an electrical circuit to the down solenoid 474 which operates the valve 314 to the left to cause the right side of the planer to lower as a result of allowing some fluid to bleed from the cylinders 64, 142 through the lines 76, 154, 318, 317 to the reservoir 270.

Thus, the right end of the cutter 14 tends to follow the lowering and raising of the right blender shoe 350a, so that the elevation of the surface sensed by the right blender shoe produces substantially the same elevation of the right end of the cutter.

Figure 8A:
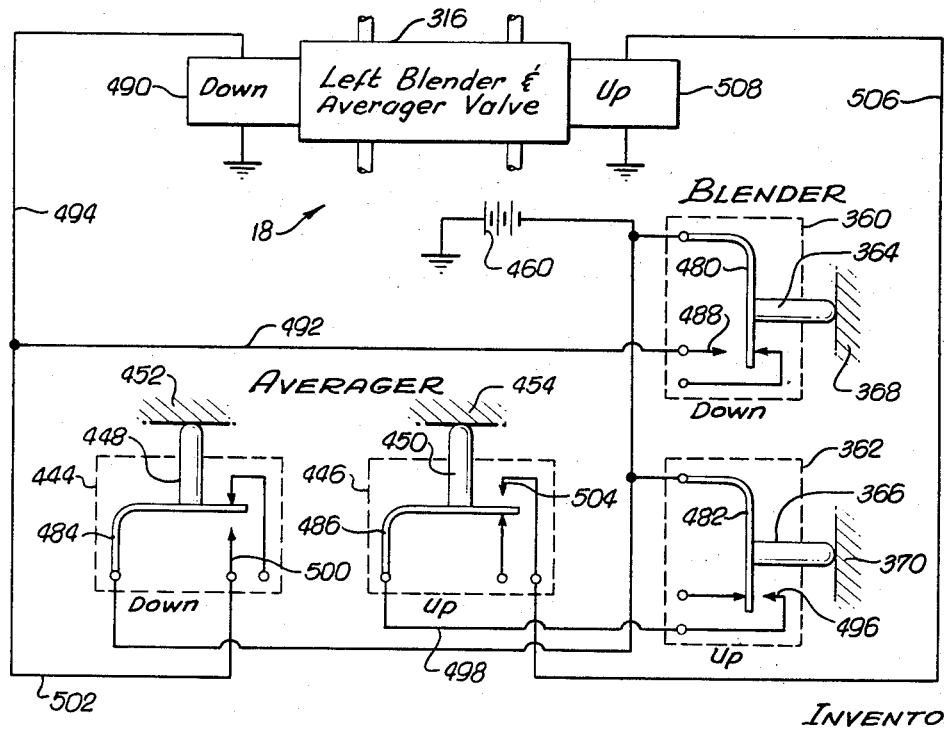
FIG. 8A is a schematic and diagrammatic illustration of portions of the left side elevation control of the planer.

FIGURE 8A diagrammatically illustrates the left side blender and the averager microswitches 360, 362, 444 and 446 and an electrical circuit between both the left side blending mechanism 30 and the averaging mechanism 26 and the left side elevation control valve 316. As noted above, the microswitches are mounted for movement toward and away from their respective stop screws 368, 370, 452 and 454 in accordance with the lowering and raising respectively of the left blender shoe 350 and the averager pivoted lever structure 378. FIGURE 8A illustrates the neutral or null position of the microswitches. The electrical power source 460 is connected to an arm 480 of left blender down microswitch 360, to an arm 482 of left blender up microswitch 362, and to an arm 484 of averager down microswitch 444. Averager up microswitch 446 has an arm 486. The microswitch arms 480, 482, 484 and 486 are biased toward the stop screws 368, 370, 452 and 454 and carry the pins 463, 366, 448 and 450 which are thus urged into engagement with the respective stop screws.

In the left blender down microswitch 360, an actuating contact 488 is normally positioned spaced a short distance from the free end of the arm 480 at the side of the arm opposite the stop screw 368. The contact 488 is connected to a down solenoid 490 of the left side control valve 316 through lines 492 and 494. In the left blender up microswitch 362, an actauting contact 496 is normally positioned spaced a short distance from the free end of the arm 482 at the same side of the arm as the stop screw 370. The contact 496 is connected through the line 498 to the arm 486 of the averager up microswitch 446. In the averager down microswitch 444, an actuating contact 500 is normally spaced a short distance from the free end of the arm 484 at the side of the arm opposite the stop screw 452. The contact 500 is connected through lines 502 and 494 to the down solenoid 490 of the left side control valve 316. In the averager up microswitch 446, an actuating contact 504 is normally spaced a short distance from the free end of the arm 486 at the same side of the arm as the stop screw 454. The contact 504 is connected through line 506 to an up solenoid 508 of the left side control valve 316.

Thus, a downward movement of the forward end of the averager lever structure 378 will raise the averager up microswitch 444 to engage the arm 484 with the contact 500. This will complete a circuit to the down solenoid 490 and operate the left side control valve 316 to the left (FIGURE 20) to lower the left end of the cutter 14. The cutter will thus be lowered no matter what the position of the shoe 350 of the left side blending mechanism 30. In particular, raising of the left side blender shoe will move the up microswitch 362 away from its stop screw 370 to engage the arm 482 with the contact 496. However, the contact 496 is in series with the arm 486 of the averager up microswitch 446, and since the averager microswitches 444 and 446 have been raised, no engagement is made between the arm 486 and the contact 504, so no circuit is completed to operate the up solenoid 508.

Similarly, a downward movement of the left blender shoe 350 will lower the left end of the cutter no matter what position the averager lever structure 378 occupies. More particularly, the left blender down microswitch 360 will be moved toward the stop screw 368 to engage the arm 480 with contact 488. This will complete a circuit to the down solenoid 490 and operate the left side control valve 316 to lower the left end of the cutter. Even an upward movement of the forward end of the averager structure 378 to lower the microswitch 444 and 446 will fail to produce a circuit to the up solenoid 508 because the arm 486 is connected to the power supply 460 through the contact 496 which does not engage the arm 482 because of the down position of the blending mechanism 30.

Thus, it will be noted that the averager and left blender up microswitches 446 and 362 are connected in series between the power supply 460 and the up solenoid 508 so that both the averaging and the left blending mechanisms 378, 30 must be raised to raise the left end of the cutter. In all other conditions, the left end of the cutter 14 will not move, or will move downwardly.

The pressure switches 310 and 311 in the lines 174, 166 between the rear elevation valves 302 and 304 and the respective rear elevation control cylinder 178 and 142 are operatiively connected to the right and left side control valves 316 and 314, respectively. When the pressure switches 310 and 311 are operated by pressure in their lines they inactivate these side control valves 316 and 314 by opening the circuits to the several solenoids 468, 474, 490, 508. Thus, when the rear of the planer is raised to elevate the cutter to a non-operative position, the pressure switches are operated to prevent the valves 316 and 314 from being controlled by the sensing mechanisms of the planer to lower the front of the planer to attempt to maintain the height of the cutter.

To maintain the cutter 14 clean and cool and to remove cut material or tailings, water is continuously discharged against the cutter, as shown schematically in FIGURE 23. The same water is also utilized as a coolant for the hydraulic fluid in the system. The water is normally maintained in the tank of an auxiliary truck (not shown) and delivered to a cooling water inlet 520 (FIG. 4) located at the rear of the planer. The cooling water, instead of flowing directly to the cutter 14, first flows through a heat exchanger 522 and then flows through suitable conduit or tubing 524 leading to the cutter, as shown schematically and diagrammatically in FIGURE 24. In the heat exchanger 522, the cooling water passes around suitable piping 526, carrying the fluid of the hydraulic system to the reservoir 270. The hydraulic system is a closed loop recirculating system in which the hydraulic fluid is drawn from the reservoir as needed and returned to the reservoir after it is used. The hydraulic fluid, which is heated by being used in the system is cooled by having its heat transferred to the water flowing through the exchanger. Water coolant flow rates of about 1,000 gallons per hour with the water initially at ambient temperatures have proven satisfactory with the illustrated planer for heat exchange purposes, cleaning and cooling the cutter 14, and effective flushing away of the cuttings from the concrete surface S.

The coolant water is delivered to the cutter 14 and along the surface S as shown schematically in FIGURE 23. A generally cylindrical water guard 530 is disposed generally concentrically around the cutter, with its inward cylindrical surface spaced from the outer surface of the cutter to permit water circulation. The lower portion of the water guard is cut away or opened, and the lower portion of the cutter extends downwardly through that opening. The water guard includes a transversely extending generally tubular manifold 532, connected to the tubing 524, which is positioned generally forwardly and above the cutter. A plurality of small outlets or nozzles 534 extend from the manifold to the interior of the water guard to discharge cooling water against the cutter over its entire length. The direction of travel of the planer and the rotation of the cutter cause the discharged water to flow rearwardly over the top and down around the cutter, through the cutting area, and outwardly from the front of the cutter. This serves to cool and clean the cutter, as well as to carry cut material or tailings free of the cutter and the cutting area. A portion of the water guard 530 at its forward lower edge and intermediate its ends is removed or cut away to provide an opening 536 for the free generally forward discharge of the water and tailings.

The operation of the concrete planer 10 may now be readily understood.

In general, the planer, which is set for a particlar predetermined amount of cut, moves forwardly over the concrete surfaces to be cut or leveled, with the cutter 14 rotating continuously to perform the cut. The rear support wheels 114 ride in the wake of the cut just performed by the cutter and are on a generally level generated surface with the exception, for example, of depressions. The left rear support wheel is set to position the left end of the cutter 14 at a determined elevation to provide a desired depth of cut at the left of the cutter. The left rear support wheel remains fixed in that position for the duration of the cut. The right front support wheel 44 may ride on the level surface T of a previous cut alongside the cutting being made, except for a first cut or run. The left front support wheel and the wheels 440 of the averaging mechanism 26 ride on the rougher surface S to be cut. It is the left front corner of the frame that is raised and lowered incident to the planer travel, and to changes in elevation of the averaging mechanism and of the left wheels to correct or adjust the height or elevation of the left end of the cutter 14 to provide a generally level surface at the predetermined elevation.

In general, the blending and averaging mechanisms 30, 28, 26 are set at null or neutral surface engaging positions in which they are inoperative and do not affect the cutter height. The mechanisms, which are constructed and arranged to move relative to the frame in response to variations in the height of the surface over which they ride, are thus moved from the neutral positions by changes in the height of the surfaces they engage. This causes a correction or adjustment in the height of the frame 12 to re-establish the neutral positions of the mechanisms relative to the frame. This adjustment of the frame height adjusts the cutter height to keep the cutter 14 moving along a predetermined path. The right blending mechanism 28 corrects or adjusts the height of the right side of the planar, and thereby the height of the right end of the cutter 14, to generally merge or blend the right edge of the new surface S being generated by the planer with the surface T adjacent to it to the right, whether it be an irregular surface or a previously cut and leveled surface. The left blending mechanism 30 and the averaging mechanism 26 similarly correct or adjust the height of the left end of the cutter. The averaging mechanism 26 senses an averaged height of the surface S over a substantial length in profile of the surface forwardly of the cutter 14 to minimize the cutter reaction to individual irregularities and to produce a generally level surface. The left blending mechanism 30, which follows the pavement surface immediately in front of the left end of the cutter, functions primarily to cause the left end of the cutter to follow the concrete surface downwardy into depressions, so that a continuous and uninterrupted surface cut is made for safety, as well as appearance.

Now the operation will be considered in further detail. The clutch 234 is disengaged by lever 244 to disengage the main hydraulic pump 242 from the engine 236, and the engine is started which operates the power steering pump 280. The steering valve 282 is operated in either direction by the control lever 284 to pressurize the system. Then the control valves 314 and 316 are actuated to the right by moving switches A and B of controls 315 and 313 to their "up" positions, causing the front elevation control cylinder and piston devices 62 and 100 to extend to raise the front of the planer frame. The rear elevation control valves 302 and 304 are also moved to the right by operating rear elevation levers 306 and 308 to "up" positions to extend the rear elevation control cylinder and piston devices 140 and 172 to elevate the rear of the planer frame and also the cutter 14 carried thereby. The steering valve 282 may then be turned to center and the clutch 234 engaged to connect the main hydraulic pump 242 to the engine. By operating the planer travel direction control valve 272 through manipulation of the control members 277, the reversible hydraulic motors 136 are operated to drive the planer forward or rearward, as desired, the speed control valve 274 being operated to control the speed of the planer. The steering valve 282 is operated by the lever 284 to connect the power steering pump 282 to one side or the other of the steering cylinder 110 to steer the front wheels of the planer. In this condition, the cutter 14 is elevated clear of the supporting surface S and the planer may be moved from place to place and positioned for the start of a cut.

Prior to cutting, the planer is levelled. The planer is set on a flat surface, with the frame and cutter in an elevated position. The depth of cut indicating mechanism 250 is set at zero through appropriate manipulation of the depth-of-cut valve 294. Then the planer is adjusted by moving the microswitch stops to cause the cutter 14 to contact the flat surface, and the blender shoes to contact the surface with the associated blender microswitches in neutral or null positions relative to their stops and thus to the frame. Also, the averager microswitches are set in a null or neutral position. This establishes the zero plane for the planer, with the cutter, the blender shoes, the left front and rear support wheels, and the averager wheels all adjusted to contact a common flat level surface and to, in general, maintain that relationship.

After the planer is leveled, the depth-of-cut is set by operating the depth-of-cut valve 294 through the control handle 298 to shift the floating piston 184 in the cylinder 178 and extend or contract the left rear elevation control device 172 to achieve the desired reading on the depth-of-cut indicating mechanism 250. As noted above, the left rear device 172 is so adjusted by introducing fluid under pressure into the region of the cylinder rearwardly of the floating piston 184. Extending the cylinder and piston device 172 will raise the cutter so that, in general, it will remove only those portions of the surface that extend a determined increment above the zero plane. The depth-of-cut dial 256 will pivot to the left and the pointer 258 will indicate the desired minus depth-of-cut increment, i.e., the amount of deviation from the zero plane of the surface which will not be removed. Conversely, contracting the cylinder and piston device 172 will lower the left end of the cutter 14 so that, in general, it will cut into the surface to the depth of the determined increment below the zero plane. The depth-of-cut dial 256 will pivot to the right and the pointer 258 will indicate a plus depthto-cut increment, i.e., the amount of the surface below the zero plane which will be removed. Once the desired depth of cut is established, the depth of cut hold valve 296 is closed by the panel control 300 to maintain the position of the floating piston 184 so that the condition of the cylinder and piston device 172 and the height of the left rear of the planer remain fixed for a particular cut or run.

To begin a cut, after the planer has been leveled and the depth of cut is set, the side control valve switches A and B are set at automatic, and the clutch 234 is engaged so that the engine is rotating the cutter 14 and the main hydraulic pump 242. The rear elevation levers 306 and 308 are lowered to lower the cutter 14 into cutting position. The planer travel direction control valve 272 and the speed control valve 274 are operated to move the planer forwardly to accomplish the cut.

FIGURES 1 and 3 illustrate the planer making a second cut to the left of and somewhat overlapping a previous cut T. The right wheels are supported on the left edge of the previous cut T, while the left rear wheel 114 is supported on the left edge of the new cut. Thus, the right wheels and the left rear wheel are on generally level smooth surfaces. FIGURE 3 illustrates the position of the blender shoes 350 and 350a incident to the second cut. The right blender shoe 350a rides upon the left edge of the previous cut T immediately in front of the right end of the cutter 14. The microswitches associated with the right blending mechanism 28 are set in the null or neutral position and are arranged to permit the microswitches 373, 374 to move an increment of about .002 to .003 inch, for example, toward or away from their stop screws 375, 376, pursuant to raising or lowering of the right blender shoe 350a by the surface T over which it rides without raising or lowering the right side of the cutter 14. However, if the right blender shoe 350a moves upwardly or downwardly to move the microswitches more than that increment, the microswitches will be operated to effect actuation of the right side control valve 314 to extend or contract the right side elevational control cylinder and piston devices 62 and 140 and raise or lower the right end of the cutter. The height of the right end of the cutter is thus corrected or adjusted by an amount of frame movement necessary to return the right blender microswitches 373, 374 to their null or inoperative positions. Thus, the right side of the cutter follows the right blender shoe 350a, so that the right edge of the new cut blends or conforms with the surface T over which the right blending shoe travels, i.e., the left edge of the previous cut.

In lieu of its relation to the right wheels 44, 114 and the right end of the cutter 14 disclosed in the drawings, the right blender shoe 350a may be positioned outwardly of the right wheels 44, 114 and further outwardly of the right of the cutter 14. This relationship will permit the planer to be operated with the right blender shoe sliding over the left margin of a previously cut surface, with the right end of the cutter overlapping the previous cut very slightly, and with the right wheels riding on the surface being cut immediately to the left of the previously cut surface. As a result, a maximum width of new cut can be taken, which blends with the previous cut immediately to its right.

The left blending mechanism 30 and the averaging mechanism 26 similarly have null or inoperative positions, and, incident to the travel of the planer, they operate automatically and continuously to correct or adjust the height of the frame 12 to re-establish these positions. Deviations in the surfaces S over which these mechanisms ride cause them to move from their inoperative positions and the frame height is varied to return the mechanisms to the neutral positions. This varies the cutter height so that the surface generated by the cutter is derived from the surfaces over which the averager and left blender mechanisms 26, 30 ride.

The averaging mechanism 26 extends forwardly of the planer along the left edge of the surface S to be cut. The four wheels 440 of the averaging mechanism engage this uncut surface at four longitudinally spaced positions, and through the pivoted wheel supports 420 and intermediate support 408 an averaged height value is provided at the forward end of the averager lever structure 378. Variation in this averaged height serves to pivot the averager lever structure 378 to control the average microswitches 444, 446 and correct or vary the frame height in response to the averaged height. The left blender shoe 350 rides upon the left edge of the surface to be cut immediately in front of the left end of the cutter 14, and variations in height of the left blender shoe serves to pivot the lever 358 and control the left blender microswitches 360, 362 to correct or vary the frame height in response to the height of the surface engaged by the left blender shoe. The movements of the left blender and averager microswitches operate, as previously noted in connection with FIGURE 8A to operate the left side control valve 316 to extend and contract the front left elevation control device 102 to raise and lower the left front of the frame, and thus the left end of the cutter 14. Downward movement of either the averaging mechanism 26 or the left blending mechanism 30 will lower the cutter so as to restore the neutral relationship or position of that mechanism to the frame, regardless of an up position of the other mechanism. When both averaging and left blending mechanisms 26, 30 are raised, the cutter 14 will be elevated to restore the neutral relationship of at least one of the mechanisms. Any other condition of the mechanisms will not affect the frame or cutter height.

Thus, in general, the left front of the frame corrects or adjusts its height in response to variations in the height of the left edge of the surface S to be cut. However, the left blending mechanism 30 will cause the left end of the cutter to follow the surface downwardly into a depression or hole which the cutter would ordinarily not reach. The cutter will not remove any substantial material from the depression or hole, but will merely cut into its upper surface to create a continuity of cutting along the entire length of the surface S traversed by the planer.

FIGURE 22 illustrates a ribbed or grooved surface as may be generated by the illustrated cutter 14. Such a ribbed, cut surface is desirable from a safety standpoint as it provides substantial traction between the road surface and the wheels of a vehicle moving over the road. Continuing such a surface into depressions or holes is therefore desirable for safety, as well as appearance.

In making an initial cut where the surface immediately to the right has not already been leveled, the right blending mechanism 28 will cause the new cut surface to feather cut to approximately zero depth-of-cut at the right end of the cut. Further, the blender shoes 350, 350a might be offset vertically from the surface being cut, permitting them to engage an external straight edge in order to produce a cut parallel to the top edge of that straight edge. The last example refers to the possibility of removing bumps encountered adjacent to expansion joints where it is desirable to know where the cut is started, where the finished surface is the only determinate, and in which the expansion joint is bounded by steel members and it is desired to produce the finished concrete surface flush with the upper surface of the steel members. A blender shoe or other sensing means could also be made to follow an optically-produced straight guide groove in the surface of a concrete runway.

When it is desired to transport the planer from one place to another, as for the begin of another run, the rear of the planer is raised by operating the rear elevation valves 302 and 304. Without the pressure switches 310 and 311, the blending mechanisms 28, 30, which are thereby lowered relative to the frame, would call for the front of the planer to move downwardly with the overall effect being that the pitch of the planer would change with the cutter remaining in its cutting position. As noted above however, the pressure switches open the electrical circuit to the microswitches of the blending mechanisms to prevent the front of the planer from being so lowered.

FIGURE 21 illustrates as line c a typical roadway surface side profile prior to cutting. Line d illustrates generally a cut surface that could be expected to be generated by the rigid planer without the averaging mechanism, and line e illustrates generally a cut surface that could be expected to be generated by the same planer equipped with the averaging mechanism.

Thus, the concrete planer shown in the drawings is capable of making heavy cuts at a relatively rapid rate. The heavy rigid frame 12 permits this rapid rate of work, while control over the surface generated is maintained. The construction of the planer with an extension forwardly from the rigid frame to sense changes in the height in profile of the surface in the path of the cutter, and produce proportionally smaller changes in the height of the cutter, permits the generation of a smooth level surface without requiring a long frame that sacrifices either rate of operation or accurate control over the profile of the surface generated. Sensing and using an averaged value of the height of the surface in the path of the cutter further reduces cutter sensitivity to individual irregularities and provides a uniform and more level cut surface. The planer operates automatically to correct or adjust the height of the cutter incident to the travel of the planer to provide the desired cut profile with a minimum of material removal. Further, a generally continuous and uniform surface is produced. The planer also utilizes the same water to both cool and flush the cutter and the cut surface and to cool the hydraulic fluid used in the planer.

I claim:

1. Concrete cutting apparatus comprising support means adapted to travel over a concrete surface to be cut, rotatable concrete cutting means carried by said support means to cut the concrete surface, said support means including adjusting means for changing the elevation of said cutting means with respect to the concrete surface, sensing means engageable with and movable along the concrete surface for sensing information related to the vertical profile of the concrete surface, and control means operated by said sensing means controlling said adjusting means to change the elevation of said cutting means in accordance with the information sensed by said sensing means while said sensing means is moving along the concrete surface.

2. Concrete cutting apparatus as defined in claim 1, wherein said sensing means is mounted on said support means to engage the concrete surface as said support means travels over the concrete surface and to be moved by changes in the height in profile of the surface engaged by said sensing means to operate said control means.

3. Concrete cutting apparatus as defined in claim 1, wherein said support means comprises a frame on which said cutter means is mounted, and said sensing means comprises a member movably supported on said frame for movement generally toward and away from the plane of the concrete surface, said member being adapted to generally continuously engage and ride upon the concrete surface incident to the travel of the apparatus thereover, said member having a predetermined neutral position and being moved in opposite directions away from that neutral position by changes in the height in profile of the surface over which said member rides, said control means being operated in response to the movement of said member in either of said directions to change the elevation of said frame and cutter means so as to return said member to said predetermined neutral position.

4. Concrete cutting apparatus as defined in claim 1, said support means including a rigid frame on which said cutter means is mounted, said sensing means including an elongataed sensor device movably supported on said frame and extending a substantial distance forwardly of said frame and cutting means for engagement with the concrete surface at said substantial distance forwardly of said cutting means, said sensor device being movable by changes in the height in profile of the concrete surface engaged, said control means being operated by said movement of said sensor device to control said adjusting means and make changes in the elevation of said cutting means that are smaller than but proportional to said changes in concrete surface height.

5. Concrete cutting apparatus as defined in claim 4, wherein said sensor device is constructed and arranged to engage the concrete surface over a substantial length thereof and to move in accordance with an averaged value of the changes in height in profile of such surface of substantial length.

6. Concrete cutting apparatus as defined in claim 1, wherein said sensing means comprises a blending mechanism for sensing information as to the height in profile of a previous cut adjacent of the concrete surface, said control means controlling said adjusting means and the elevation of said cutting means in response to the information sensed by said blending mechanism to generally blend the present cut made by said cutting means with the adjacent previous cut.

7. Concrete cutting apparatus as defined in claim 6, wherein said blending mechanism includes a movable member positioned to engage the surface of the previous cut adjacent to the present cut and to be moved by changes in the height in profile of the surface so engaged, said control means being operated by the movement of said member to control said adjusting means and the height of said cutting means adjacent to said previous cut to generally align adjacent portions of the previous and present cut with one another.

8. Concrete cutting apparatus as defined in claim 1, wherein said sensing means comprises an averaging mechanism disposed forwardly of said cutting means, said averaging mechanism being constructed and arranged to sense changes in an averaged height in profile of the concrete surface over a substantial profile length thereof in the path of said cutting means, said control means controlling said support means to change the elevation of said cutting means in accordance with said changes in said averaged height sensed by said averaging mechanism.

9. Concrete cutting apparatus as defined in claim 8, wherein said averaging mechanism comprises an elongate averager member pivotally supported on said support means and extending from its pivot point a substantial distance forwardly of said cutting means, an elongate generally horizontally forwardly extending averager support pivotally connected approximately intermediate its ends to said averager member adjacent the forward end of said averager member, an averager surface engaging wheel assembly pivotally connected adjacent one end of said averager support and another wheel assembly being pivotally connected adjacent the other end of said averager support, said assemblies engaging the uncut concrete surface in the path of the cutting means incident to the travel of the apparatus over the surface.

10. Concrete cutting apparatus as defined in claim 9, wherein each of said wheel assemblies comprises a generally horizontally forwardly extending wheel support pivotally connected approximately intermediate its ends to the averager support and a pair of concrete surface engaging wheels carried by the opposite end portions of said wheel support.

11. Concrete cutting apparatus as defined in claim 1, wherein said sensing means comprises a blending mechanism for sensing changes in the height in profile of the concrete surface immediately in advance of said cutting means, said control means being operated by said blending mechanism to control the elevation of said cutting means in accordance with said sensed information so as to maintain at least minimum cutting contact between the concrete surface and said cutting means, whereby a continuous generally uniform cut surface is generated in the concrete.

12. Concrete cutting apparatus as defined in claim 11, wherein said blending mechanism includes a movable member positioned on said support means to engage the uncut surface immediately in advance of said cutting means, said control means being operated by the movement of said member caused by changes in the height in profile of the surface to change the elevation of said cutting means in response to said changes.

13. Concrete cutting apparatus as defined in claim 1, wherein said sensing means comprises a blending mechanism for sensing information as to the height in profile of an uncut portion of the concrete surface immediately in advance of said cutting means, said sensing means also includes an averaging mechanism for sensing information as to an averaged height in profile of a substantial length of an uncut portion of the concrete surface in the path of said cutting means.

14. Concrete cutting apparatus as defined in claim 13, wherein said sensing means further comprises a second blending mechanism for sensing information as to the height in profile of a previously cut adjacent portion of the concrete surface immediately forwardly of said cutting means.

15. Concrete cutting apparatus as defined in claim 1, wherein said sensing means comprises a blending mechanism for sensing information as to the height in profile of an uncut portion of the concrete surface immediately in front of said cutting means, said sensing means also including an elongate sensor mechanism for sensing information as to the height in profile of an uncut portion of the concrete surface of substantial distance forwardly of said cutting means, said control means being operated by said sensing means to cause said cutting means to move downwardly whenever either said blending mechanism or said sensor mechanism senses a lowering in the height of the concrete surface, but said control means being operated by said sensing means to cause said cutting means to move upwardly only when both of said mechanisms sense a rising in the height of the concrete surface.

16. Concrete cutting apparatus as defined in claim 15, wherein said sensor mechanism senses an averaged height in profile of a substantial length in profile of the concrete surface in advance of said cutting means.

17. Concrete cutting apparatus comprising a relatively heavy rigid frame, four wheel assemblies supporting said frame for travel over a concrete surface to be cut, each assembly supporting one corner of said frame, each assembly comprising a ground engaging wheel, an arm pivotally secured to said frame and supporting said wheel, and a hydraulically operated device connected between said arm and said frame for extension and contraction to effect limited pivotal movement of said arm relative to said frame to raise and lower said frame, hydraulic means on said frame for operating said hydraulically operated devices, a generally cylindrical concrete cutter mounted on said frame for rotation about a transversely extending generally horizontal axis located intermediate the forward and rearward ends of said frame, a first blending mechanism movably supported on said frame at one side of said frame for engaging a previously cut portion of the concrete surface incident to travel of the apparatus over the concrete surface and being movable by changes in the height of the concrete surface engaged by said first blending mechanism, first actuating means operable in response to movement of said first blending mechanism to actuate said hydraulic control means to operate at least one of said hydraulically operated devices at said one side of said frame to raise and lower said frame in accordance with the changes in height of the concrete surface engaged by said first blending mechanism, a second blending mechanism movably supported on said frame at the other side of said frame for engaging an uncut portion of the concrete surface immediately in front of said cutter incident to travel of the apparatus over the concrete surface and being movable by changes in the height of the concrete surface engaged by said second blending mechanism, second actuating means operable in response to movement of said second blending mechanism to actuate said hydraulic control means to operate at least one of said hydraulically operated devices at said other side of said apparatus to raise and lower said frame in accordance with the changes in the height of the concrete surface engaged by said second blending mechanism, an averaging mechanism movably supported on said frame and extending a substantial distance forwardly of said frame for engaging an uncut portion of the concrete surface at spaced points extending over a substantial length of the concrete surface forwardly of said cutter, said averaging mechanism being movable in accordance with the average change in height of the concrete surface at said points, third actuating means operable in response to movement of said averaging mechanism to actuate said hydraulic control means to operate at least one of said hydraulically operated devices at said other side of said apparatus to raise and lower said frame in accordance with the changes in the height of the concrete surface engaged by said averaging mechanism.

18. A method for cutting concrete comprising moving a rotatable concrete cutter forwardly over a generally horizontal concrete surface, rotating the cutter to cut a portion of the surface incident to the forward movement of the cutter, sensing information as to the elevation of a reference surface, and moving the cutter generally vertically of the concrete surface in accordance with the information so sensed.

19. A method for cutting concrete as defined in claim 18, wherein said reference surface is said concrete surface.

20. A method for cutting concrete as defined in claim 19, wherein the sensing is done automatically incident to the forward movement of the cutter and the cutter is automatically moved vertically of the concrete surface in response to the sensed information.

21. A method for cutting concrete as defined in claim 19, wherein said reference surface is the uncut concrete surface forwardly of the cutter.

22. A method for cutting concrete as defined in claim 19, wherein said reference surface includes a substantial length of uncut surface forwardly of the cutter, and the cutter is moved vertically of the concrete surface in accordance with an average elevation of said substantial length of uncut surface.

23. A method for cutting concrete as defined in claim 22, wherein said reference surface also includes the uncut concrete surface in advance of and closely adjacent the cutter, and the cutter is lowered when the last-mentioned reference surface sensed is a depression, regardless of the condition of said substantial length of uncut surface.

24. A method for cutting concrete comprising moving a rotatable concrete cutter forwardly over a generally horizontal concrete surface including a surface to be cut, rotating the concrete cutter to cut the surface incident to forward movement of the cutter, moving one end of the cutter vertically of the surface in accordance with the height in profile of a reference surface, and maintaining the other end of the cutter at a predetermined elevation.

25. A method for cutting concrete as defined in claim 24, wherein the reference surface comprises a previously cut concrete surface alongside the surface to be cut.

26. A method for cutting concrete as defined in claim 24, wherein the reference surface is an uncut surface alongside the surface to be cut and with which the cut performed by the cutter is made to blend.

27. Concrete cutting apparatus comprising a rigid frame having a forward and rearward end, rear wheel support means supporting the rearward end of said frame and front wheel support means supporting the forward end of said frame for common travel over a concrete surface to be cut, concrete cutting means mounted on said frame intermediate said front and rear wheel means for engaging the concrete surface to cut the same incident to travel of the apparatus over the concrete surface, said front wheel means supporting the front end of said frame for vertical adjustment of said forward end to vary the elevation of said cutting means, elongate sensing means movably mounted on and extending a substantial distance forwardly of said frame, said sensing means being adapted to engage the concrete surface at a substantial distance forwardly of said frame incident to travel of said apparatus over the concrete surface, said sensing means being movable from a neutral position relative to said frame by variations in the height in profile of the concrete surface engaged by said sensing means, control means responsive to movement of said sensing means from said neutral position to control said front wheel support means to raise or lower the forward end of said frame and correspondingly raise or lower said cutting means, raising or lowering of the forward end of said frame restoring said sensing means to said neutral position.

28. Concrete cutting apparatus comprising support means adapted to travel over a concrete surface to be cut, concrete cutting means carried by said support means to cut the concrete surface, said support means including front wheel means forwardly of said cutting means and rear wheel means rearwardly of said cutting means, said support means also including coupling means between said front and rear wheel means for vertically shifting one of said wheel means relative to said cutting means in the opposite direction to the vertical direction in which the other of said wheel means is shifted relative to said cutting means, whereby the cutting means will tend to be maintained at a predetermined height relative to the concrete surface.

29. Concrete cutting apparatus as defined in claim 28, control means for adjusting the vertical position of said front and rear wheel means as a unit relative to the position of said cutting means to thereby control the elevation of said cutting means relative to the concrete surface.

30. Concrete cutting apparatus comprising elongate cutting means, support means for supporting said cutting for joint travel of said cutting means and support means over a concrete surface to be cut, said cutting means being disposed in a generally transversely extending position relative to the direction of travel, and control means for adjusting the vertical relation of said support means to the concrete surface to independently change the elevation of each end of said cutting means.

31. Concrete cutting apparatus as defined in claim 30, wherein said support means includes a pair of support wheel assemblies at each side of said support means, one support wheel assembly of each pair being forwardly of said cutting means and one support wheel assembly of each pair being rearwardly of said cutting means, at least one support wheel assembly of each pair being adjustable to change the elevation of the associated end of said cutting means.

32. Concrete cutting apparatus as defined in claim 30, wherein said support means includes a pair of support wheel assemblies at each side of said support means, one support wheel assembly of each pair being forwardly of said cutting means and one support wheel assembly of each pair being rearwardly of said cutting means, said control means being adapted to independently adjust each of said wheel assemblies to control the elevation of said cutting means relative to the concrete surface.

33. Concrete cutting apparatus as defined in claim 31, wherein said support means further includes coupling means between the forwardly and rearwardly support wheel assemblies of one pair for vertically shifting in one direction the position of one of said one pair of wheel assemblies relative to the cutting means when the vertical position of the other wheel assembly of said one pair is shifted in the opposite direction relative to the cutting means so as to generally maintain the associated end of said cutting means at a predetermined height relative to the concrete surface despite changes in the elevation in one or the other of the support wheel assemblies of said one pair.

34. Concrete cutting apparatus as defined in claim 31, including a first blender means supported on said support means adjacent one end of said cutting means for sensing information as to the height in profile of a previously cut adjacent surface, a second blender means mounted on said apparatus forwardly of the other end of said cutting means for sensing information as to the height in profile of the concrete surface in the path of said cutting means, and means operatively connecting said control means to said first and second blender means to change the elevation of each end of said cutting means.

35. Concrete cutting apparatus as defined in claim 34, including a forward sensing means mounted on said support means and extending a substantial distance forwardly of an end portion of said cutting means for sensing the height in profile of the uncut concrete surface in the path of said end portion of said cutting means at said substantial distance forwardly of said cutting means, and means operatively connecting said forward sensing means to said control means to change the elevation of said end portion of said cutting means.

36. Concrete cutting apparatus as defined in claim 31, said support means further including a frame, said adjustable support wheel assemblies each comprising an arm movably mounted on said frame, a support wheel mounted on said arm and engageable with the concrete surface, and means connected to said frame and arm to change the position of said arm relative to said frame to change the elevation of said frame and said cutting means relative to the concrete surface.

37. Concrete cutting apparatus as defined in claim 36, wherein said connecting means comprises an extendible and contractible fluid operated cylinder and piston device.

38. Concrete cutting apparatus as defined in claim 36, wherein said connecting means comprises a cylinder, a piston structure shiftable in said cylinder, a floating adjusting piston in said cylinder, and fluid passage means connected to said cylinder for conducting fluid under pressure to said cylinder between said piston structure and piston and to said cylinder on the side of said piston opposite said piston structure.

39. Concrete cutting apparatus as defined in claim 38, wherein said passage means to the cylinder between said piston structure and floating piston extends through the piston structure.

40. Concrete cutting apparatus as defined in claim 30, wherein said support means includes a frame and a pair of support wheel assemblies on each side of said frame, one support wheel assembly of each pair being forwardly of said cutting means and the other support wheel assembly of each pair being rearwardly of said cutting means, at least one support wheel assembly of one pair being adjustable to change the height of the associated end of said cutting means, both of said support wheel assemblies of the other pair being adjustable to change the height of the associated end of said cutting means, each of said adjustable support wheel assemblies comprising an arm movably mounted on said frame, a support wheel mounted on said arm and adapted to engage the concrete surface, and means connected to said frame and said arm to change the position of said arm relative to said frame to change the elevation of said frame and said cutting means relative to the concrete surface, said connecting means for each of said support wheel assemblies of said other pair each comprising a hydraulically operated expandable and contractible cylinder-and-piston device, and coupling means hydraulically interconnecting said cylinders of said devices so that vertical movement in one direction of one support wheel of said other pair relative to said frame produces vertical movement in the opposite direction of the other support wheel of said other pair relative to said frame.

41. Concrete cutting apparatus as defined in claim 31, including a frame, each of said adjustable wheel assemblies including a hydraulically operated cylinder-and-piston device connected to said frame for controlling the position of said wheel assembly relative to said frame and thereby control the elevation of said frame, each of said devices including a cylinder, a hydraulic pump connected to said cylinders, a fluid reservoir connected to said pump, and means operable to selectively place said cylinders in communication with said pump or with said reservoir to operate said cylinder and piston devices and shift said cutting means vertically.

42. Concrete cutting apparatus comprising support means adapted to travel over a concrete surface, cutting means supported on said support means in a transversely extending position for rotation about a generally horizontal axis to cut the surface incident to travel of said support means and cutting means over the concrete surface, said support means including first support wheel means positioned at one end of said cutting means and second support wheel means positioned at the other end of said cutting means, said first support wheel means being positioned to ride on the level surface of a prior cut in the concrete surface and to locate said one end of said cutting means in a position to ride over the adjacent edge of said prior cut, said second support wheel means including a rear support wheel positioned to ride over the level surface of a cut being made by the cutting means and a front support wheel positioned to ride on the uncut surface in the path of the cutting means, and means for adjusting said front support wheel vertically to change the elevation of said other end of said cutting means relative to the concrete surface.

43. Concrete cutting apparatus as defined in claim 42, including blending means for sensing information as to the height in profile of the adjacent edge of the prior cut, and control means operated by said blending means for controlling said first support wheel means to adjust the elevation of said one end of said cutting means to blend the cut being made by said cutting means into said prior cut.

44. Concrete cutting apparatus as defined in claim 42, including means for adjusting said rear support wheel vertically to determine the depth of cut of said other end of said cutting means.

45. Concrete cutting apparatus as defined in claim 42, including means for adjusting said rear support wheel vertically to determine the depth of cut of said other end of said cutting means in said concrete surface, sensing means for sensing information as to the height in profile of the uncut surface in the path of said cutting means, and means interconnecting said sensing means and adjusting means, whereby said front support wheel is adjusted in response to said sensing means.

46. Concrete cutting apparatus as defined in claim 43, said support means including a rigid frame, said first support wheel means including a rear support wheel and a front support wheel, means coupling said rear and front support means for simultaneous vertical movement in opposite directions, means for vertically adjusting the rear support wheel of said second support wheel means to establish a set cutting height for said other end of said cutting means relative to said concrete surface for a predetermined depth of cut, sensing means for sensing information as to the height in profile of the uncut surface in the path of said cutting means, and means operatively connecting said sensing means and adjusting means whereby said front support wheel of said second support wheel means is vertically adjusted in response to said sensing means.

References Cited

UNITED STATES PATENTS

| | | | |
|---|---|---|---|
| 1,812,771 | 6/1931 | Blood et al. | 299—41 |
| 2,591,502 | 4/1952 | Bohannan et al. | 94—46 |
| 2,606,011 | 8/1952 | Lommen | 299—39 X |
| 2,873,541 | 2/1959 | Eliason. | |
| 3,063,690 | 11/1962 | Cornell | 299—39 |
| 3,330,072 | 7/1967 | Janis et al. | 51—35 |

ERNEST R. PURSER, *Primary Examiner.*